Aug. 2, 1938. W. M. CARROLL Re. 20,815
RECORDING DEVICE FOR LIQUID DISPENSING APPARATUS
Original Filed Oct. 1, 1928 16 Sheets-Sheet 1
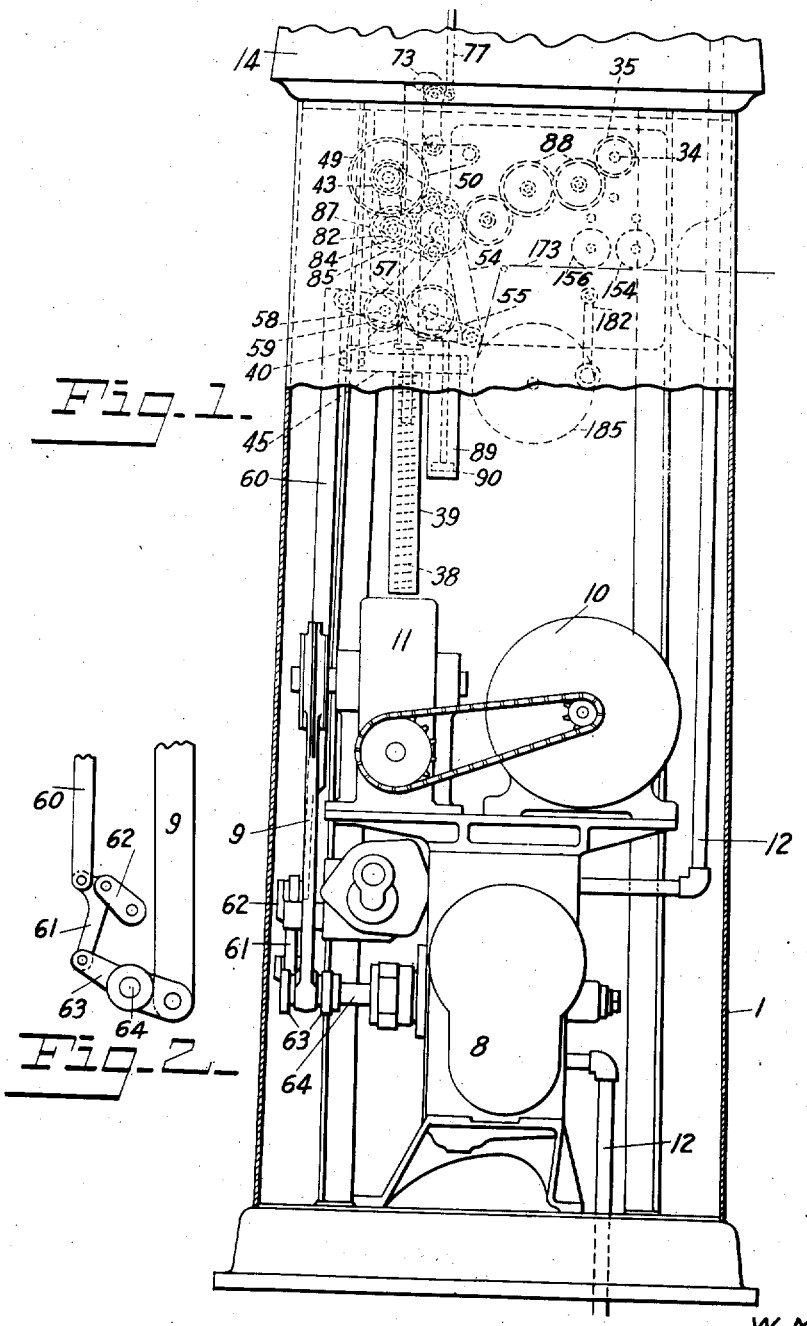
INVENTOR.
W. M. CARROLL.
By
Edward A. Reed
ATTORNEY.

RECORDING DEVICE FOR LIQUID DISPENSING APPARATUS
Original Filed Oct. 1, 1928 16 Sheets-Sheet 2
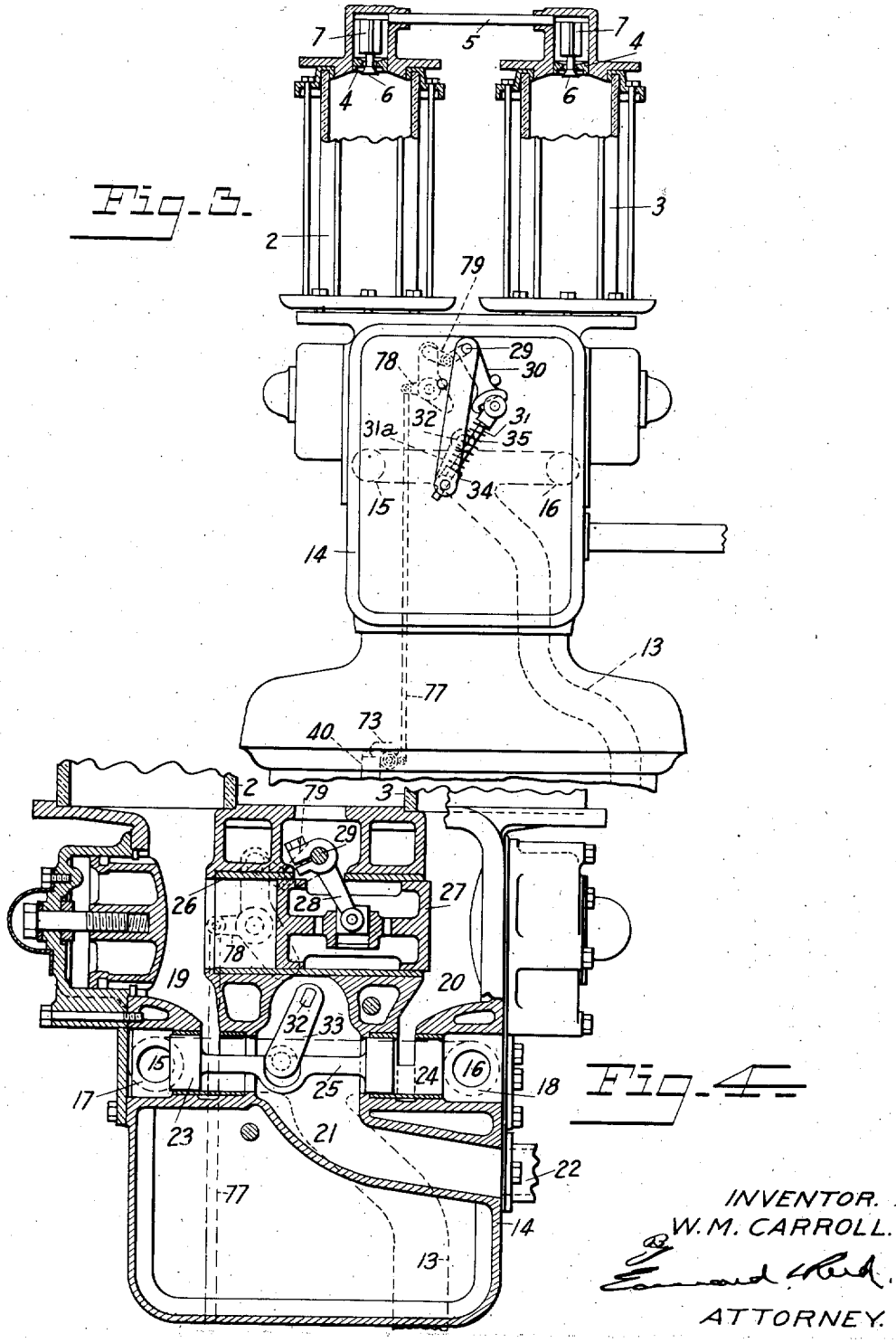
INVENTOR.
W. M. CARROLL.
Edmund Ward
ATTORNEY.

RECORDING DEVICE FOR LIQUID DISPENSING APPARATUS
Original Filed Oct. 1, 1928 16 Sheets-Sheet 3
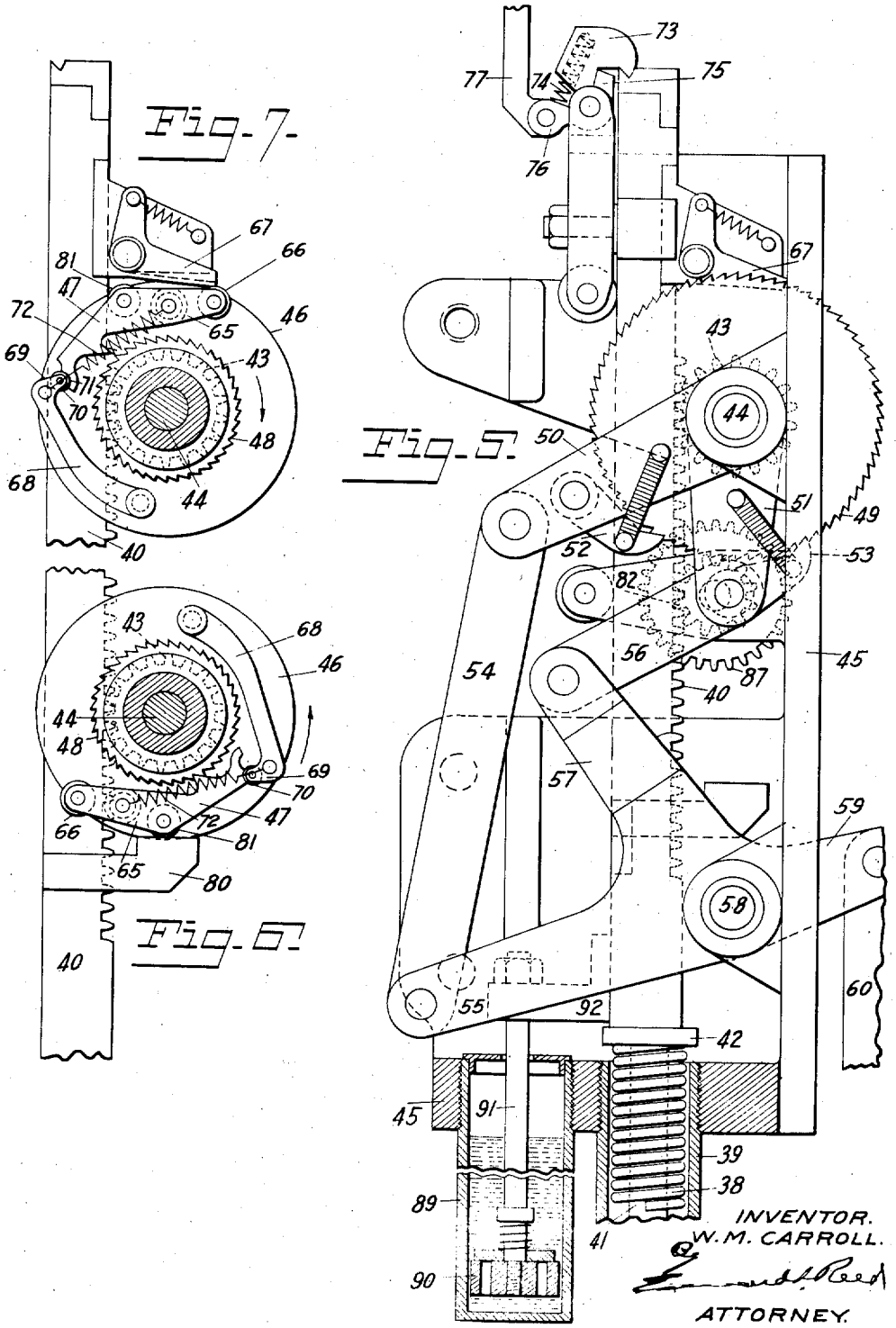

RECORDING DEVICE FOR LIQUID DISPENSING APPARATUS

Original Filed Oct. 1, 1928 16 Sheets-Sheet 4

INVENTOR.
W. M. CARROLL.

ATTORNEY.

RECORDING DEVICE FOR LIQUID DISPENSING APPARATUS

Original Filed Oct. 1, 1928 16 Sheets-Sheet 5

INVENTOR.
W. M. CARROLL.
Edward A. Reid
ATTORNEY.

Aug. 2, 1938. W. M. CARROLL Re. 20,815

RECORDING DEVICE FOR LIQUID DISPENSING APPARATUS

Original Filed Oct. 1, 1928 16 Sheets-Sheet 6

INVENTOR.
W. M. CARROLL.
by Edward H. Reid
ATTORNEY.

Aug. 2, 1938. W. M. CARROLL Re. 20,815

RECORDING DEVICE FOR LIQUID DISPENSING APPARATUS

Original Filed Oct. 1, 1928 16 Sheets-Sheet 7

INVENTOR.
W. M. CARROLL.
By
Edward Reid
ATTORNEY.

Aug. 2, 1938. W. M. CARROLL Re. 20,815

RECORDING DEVICE FOR LIQUID DISPENSING APPARATUS

Original Filed Oct. 1, 1928 16 Sheets-Sheet 8

INVENTOR.
W. M. CARROLL.
By Edmund Rod
ATTORNEY.

RECORDING DEVICE FOR LIQUID DISPENSING APPARATUS

Original Filed Oct. 1. 1928 16 Sheets-Sheet 9

INVENTOR.
W. M. CARROLL.
Edward H. Reid
ATTORNEY.

RECORDING DEVICE FOR LIQUID DISPENSING APPARATUS

Original Filed Oct. 1, 1928 16 Sheets-Sheet 10

INVENTOR.
W. M. CARROLL.

ATTORNEY.

RECORDING DEVICE FOR LIQUID DISPENSING APPARATUS

Original Filed Oct. 1, 1928 16 Sheets-Sheet 11

INVENTOR.
W. M. CARROLL.
By Edward H. Reed
ATTORNEY.

RECORDING DEVICE FOR LIQUID DISPENSING APPARATUS

Original Filed Oct. 1, 1928 16 Sheets-Sheet 12

INVENTOR.
W. M. CARROLL.
Edmund A. Reid
ATTORNEY.

RECORDING DEVICE FOR LIQUID DISPENSING APPARATUS

Original Filed Oct. 1, 1928 16 Sheets-Sheet 13

INVENTOR.
W. M. CARROLL.
Edward H. Reid
ATTORNEY.

RECORDING DEVICE FOR LIQUID DISPENSING APPARATUS

Original Filed Oct. 1, 1928 16 Sheets-Sheet 14

INVENTOR.
W. M. CARROLL.

ATTORNEY

RECORDING DEVICE FOR LIQUID DISPENSING APPARATUS
Original Filed Oct. 1, 1928 16 Sheets-Sheet 15
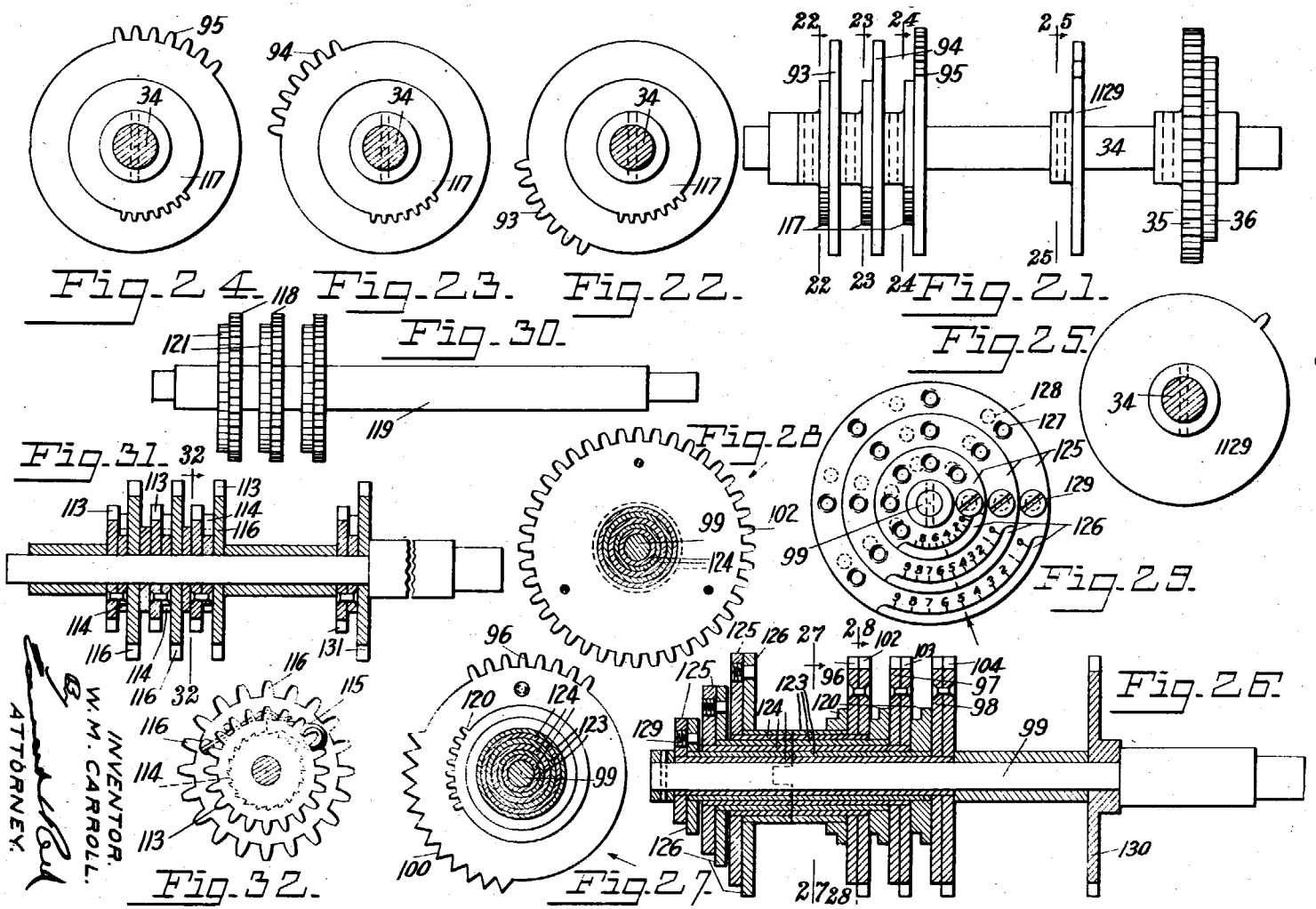
INVENTOR.
W. M. CARROLL.
BY
ATTORNEY.

RECORDING DEVICE FOR LIQUID DISPENSING APPARATUS
Original Filed Oct. 1, 1928 16 Sheets-Sheet 16
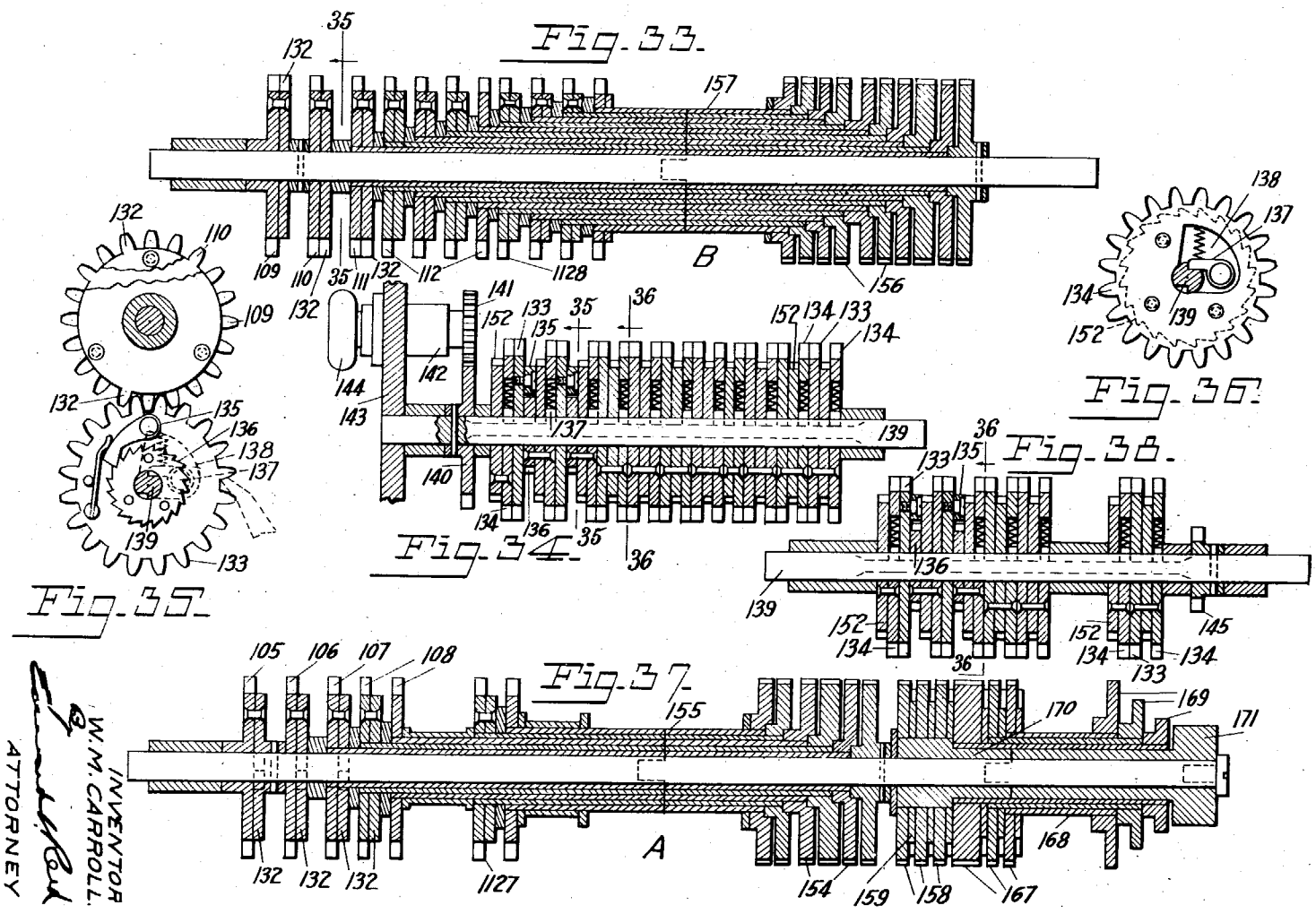
INVENTOR
W. M. CARROLL.
By Edward Rod
ATTORNEY Reissued Aug. 2, 1938 Re. 20,815

UNITED STATES PATENT OFFICE 20,815

RECORDING DEVICE FOR LIQUID DISPENSING APPARATUS

William M. Carroll, Fort Wayne, Ind., assignor, by mesne assignments, to The Wayne Pump Company, Fort Wayne, Ind., a corporation of Maryland Original No. 1,940,656, dated December 19, 1933, Serial No. 309,557, October 1, 1928. Application for reissue November 21, 1934, Serial No. 754,196

44 Claims. (Cl. 221—95)

This invention relates to a recording device for a liquid dispensing apparatus, such as a gasoline measuring pump, and it is designed for the purpose of accurately recording the amount of and the money value of liquid dispensed by said apparatus.

It has been proposed heretofore to provide liquid dispensing apparatus with recording devices but, for the most part, at least, these devices have been controlled by the piston rod or other movable part of the pumping mechanism and recorded the movements of the pump rather than the amount of liquid discharged and in the event the pump did not discharge a full measure of liquid due to leaky pistons, leaky valves or the like the record preserved by such a device would be inaccurate.

One object of the present invention is to provide a liquid dispensing apparatus with a recording device which will preserve an accurate record relating to the liquid actually discharged by that apparatus.

A further object of the invention is to provide such a recording device which will compute and record the money value of the liquid discharged at a selected price per unit; and which will effect such computation at prices per unit including fractions of a cent.

A further object of the invention is to provide a recording device which will be actuated by a spring motor, the spring of which will be placed under compression by the pumping mechanism but the operation of which will be controlled by the device which controls the discharge of liquid from the measuring apparatus.

A further object of the invention is to provide a liquid dispensing apparatus comprising twin measuring receptacles which are alternately filled and emptied, with a recording device which will be operated on the opening of the dischage line of either measuring receptacle to make a record of the quantity and money value of the liquid discharged from that receptacle.

A further object of the invention is to provide such ap apparatus with a spring motor especially adapted to control the recording mechanism.

A further object of the invention is to provide such a recording mechanism with means for issuing, at the end of each delivery of liquid, a ticket bearing the data relating to that transaction and to preserve a separate record of the details of each transaction and of the total of several transactions.

Other objects of the invention will appear as the apparatus is described in detail.

Figure 8:
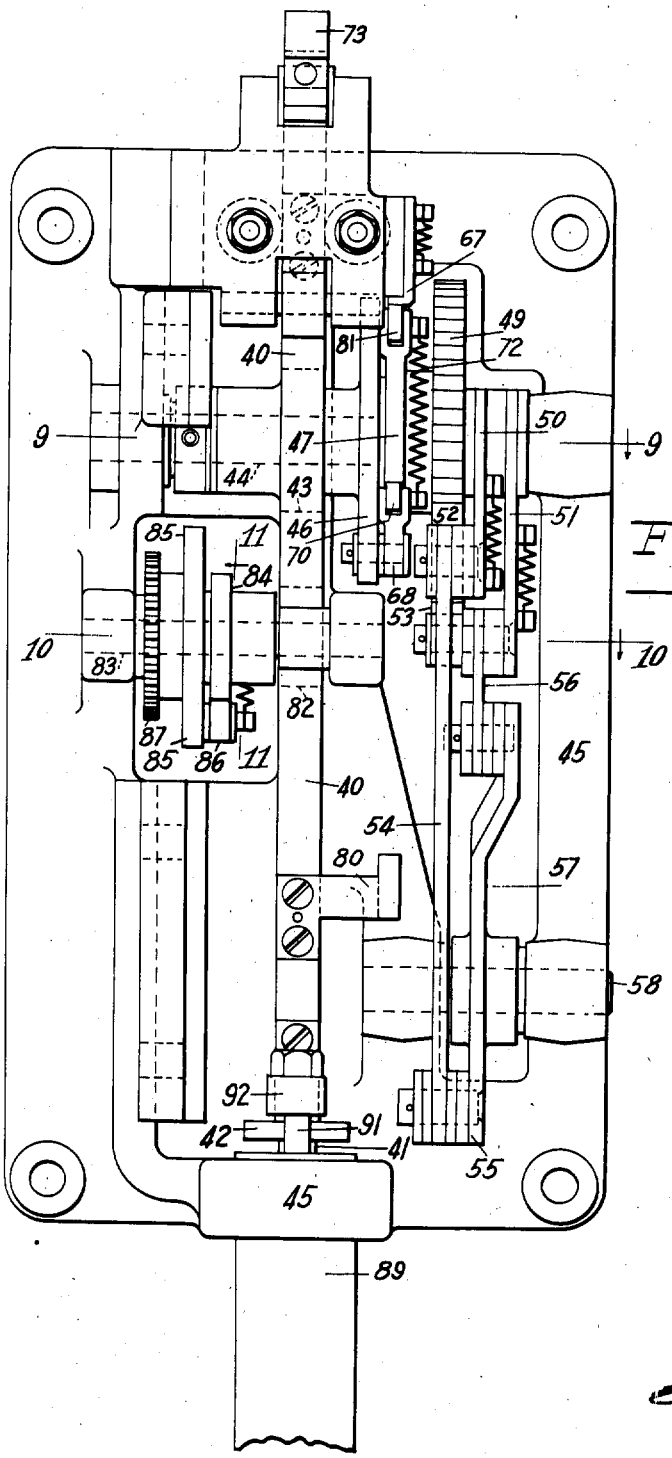
Figure 9:
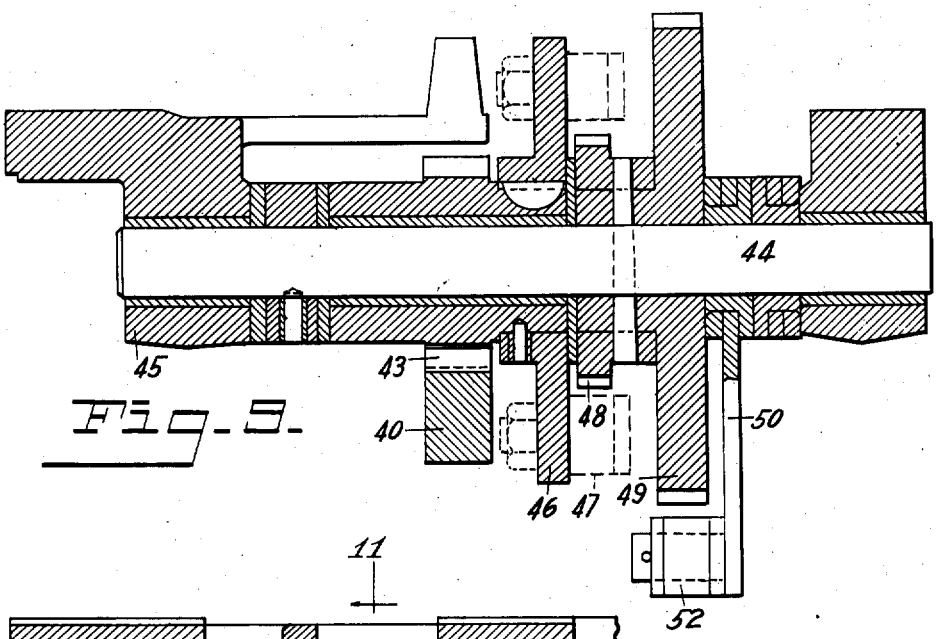
Figure 10:
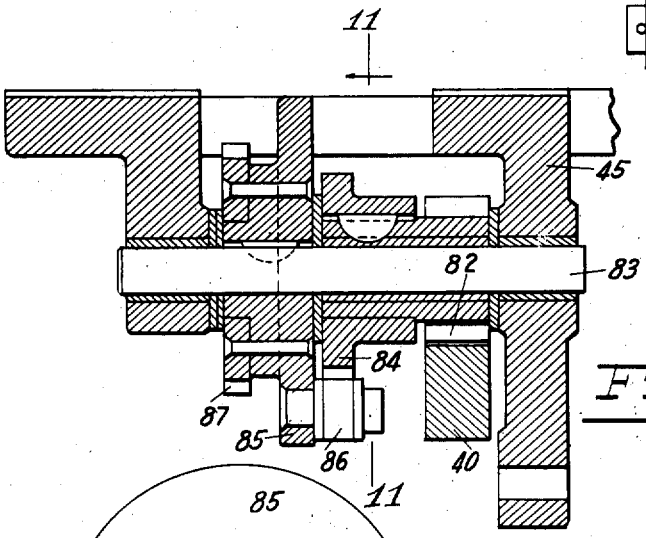
Figure 11:
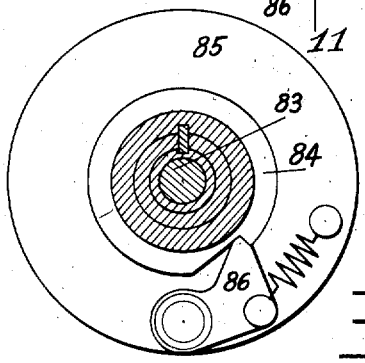
Figure 12:
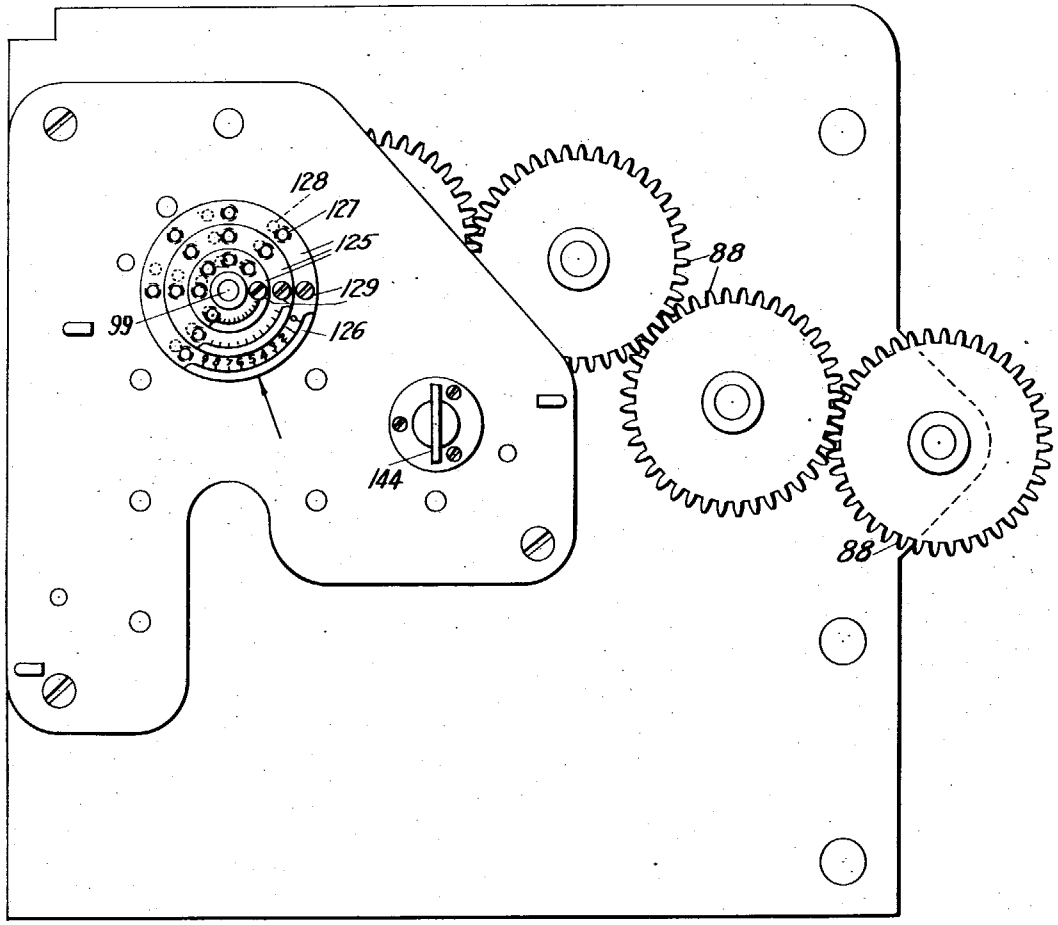
Figure 13:
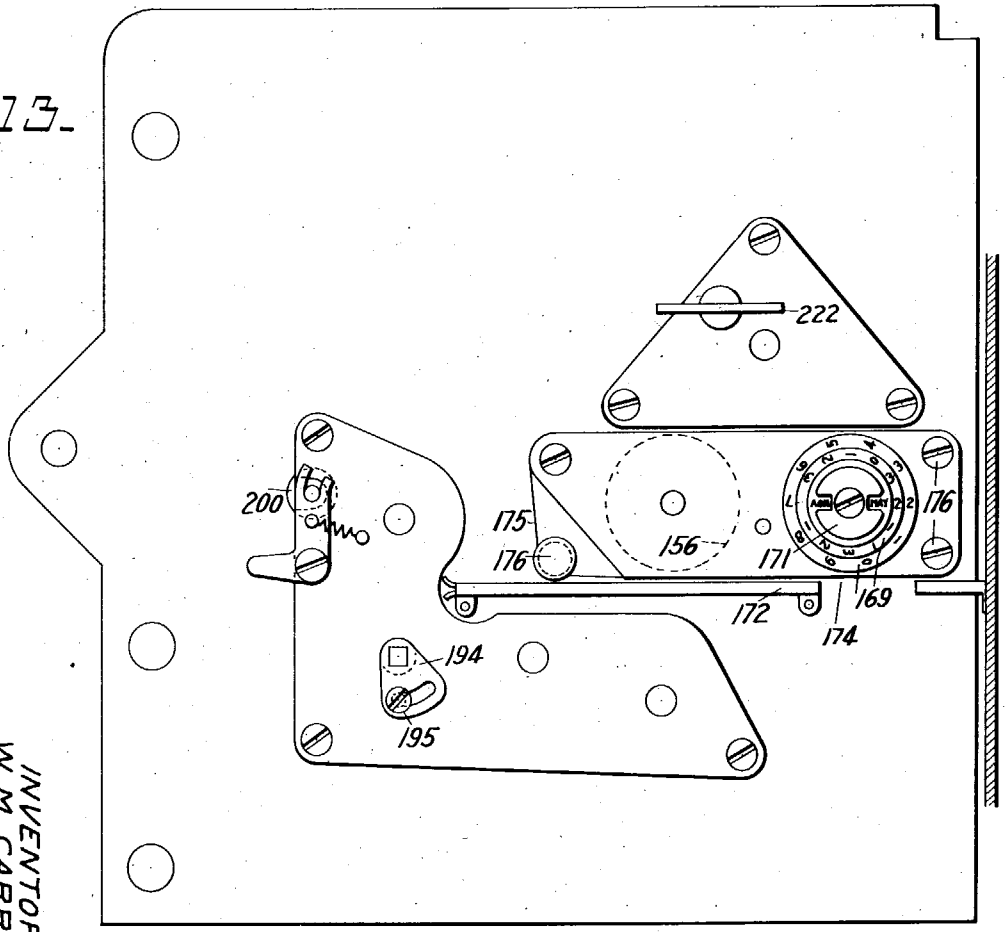
Figure 14:
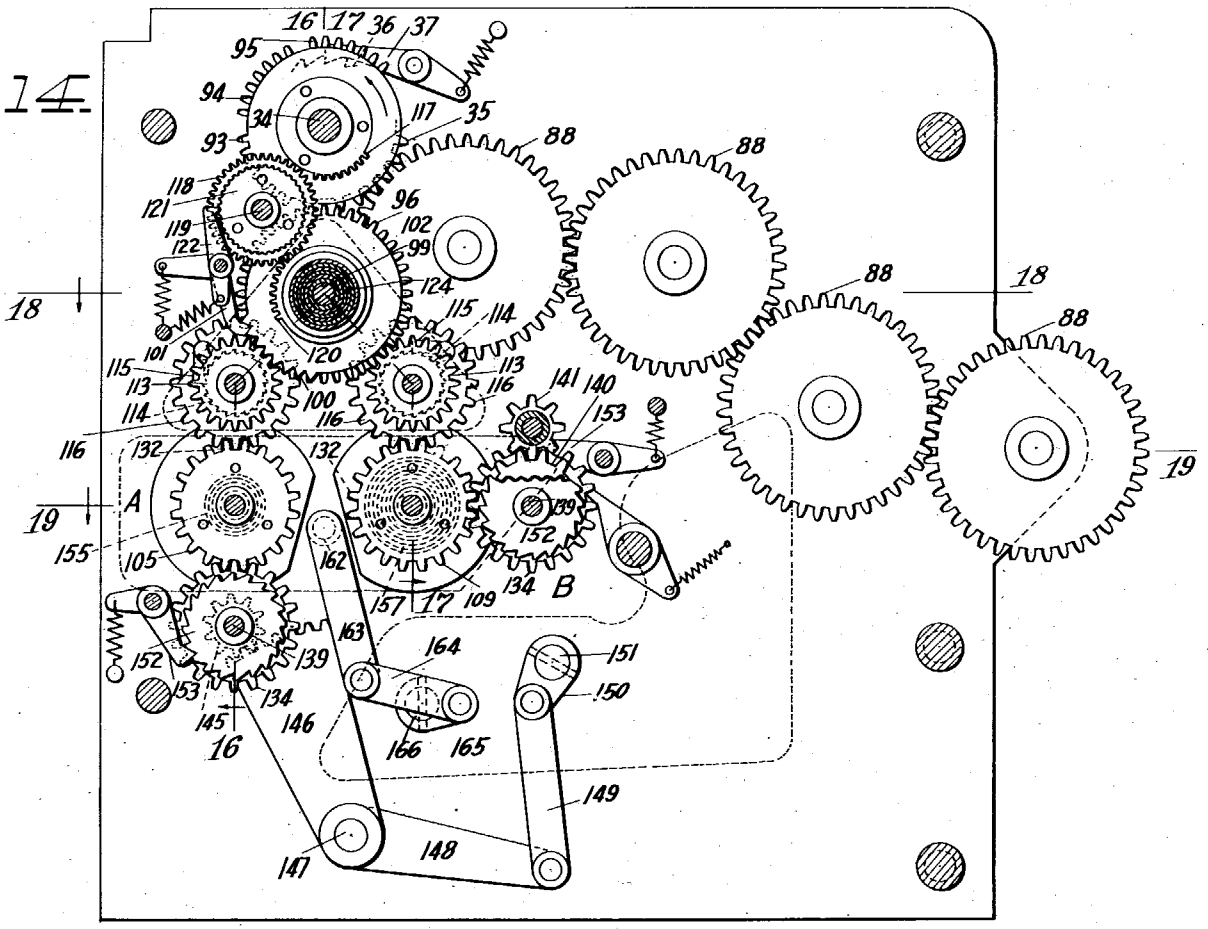
Figure 15:
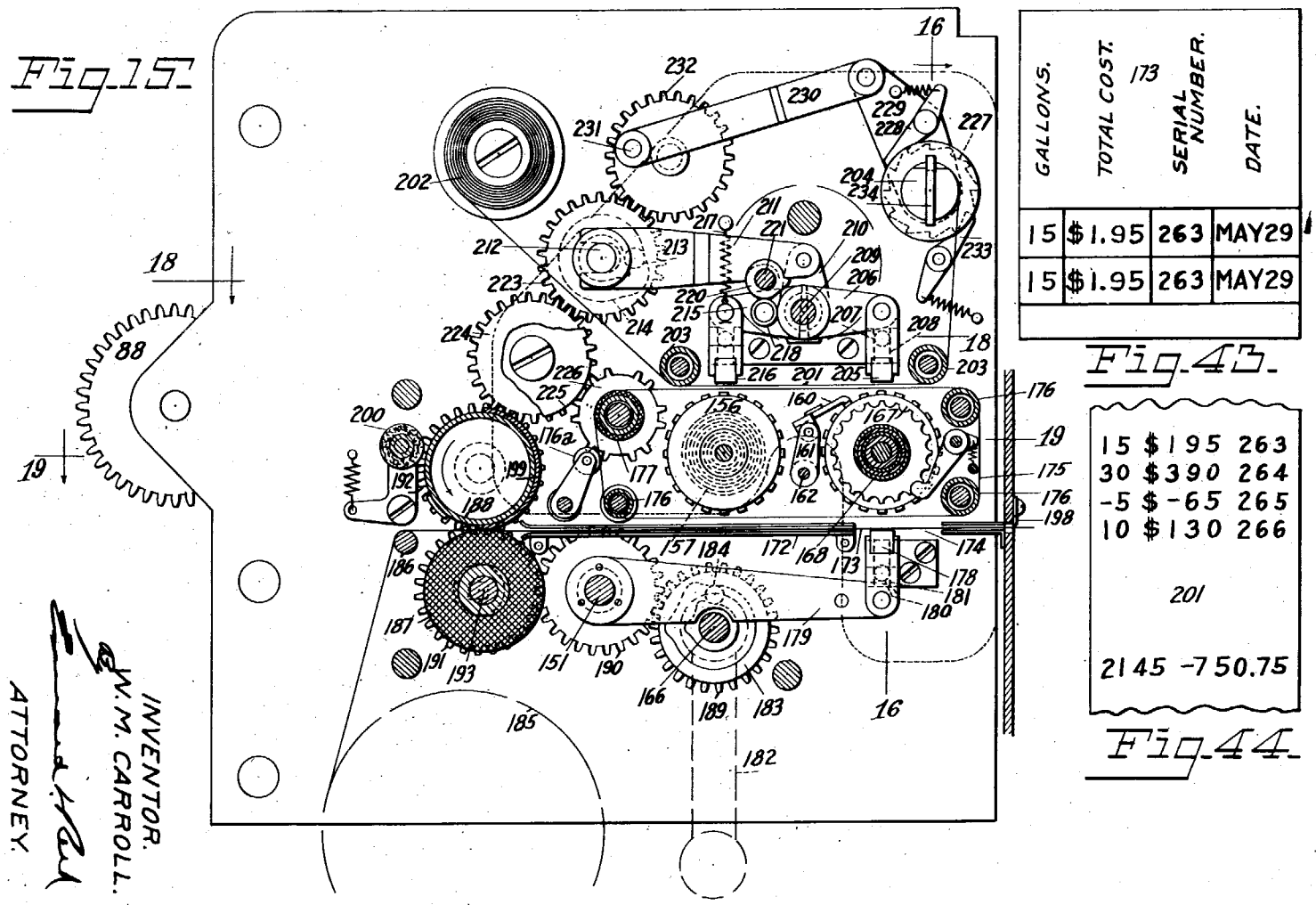
Figure 16:
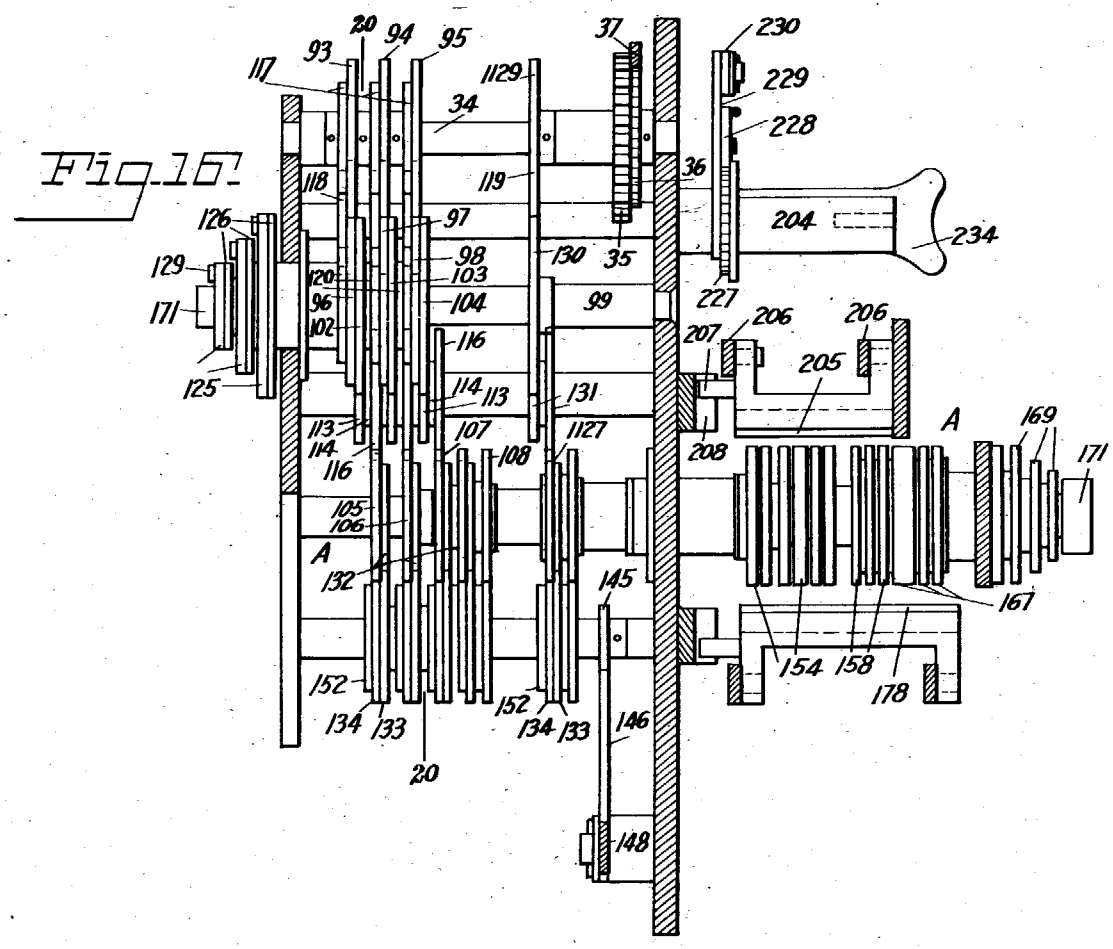
Figure 17:
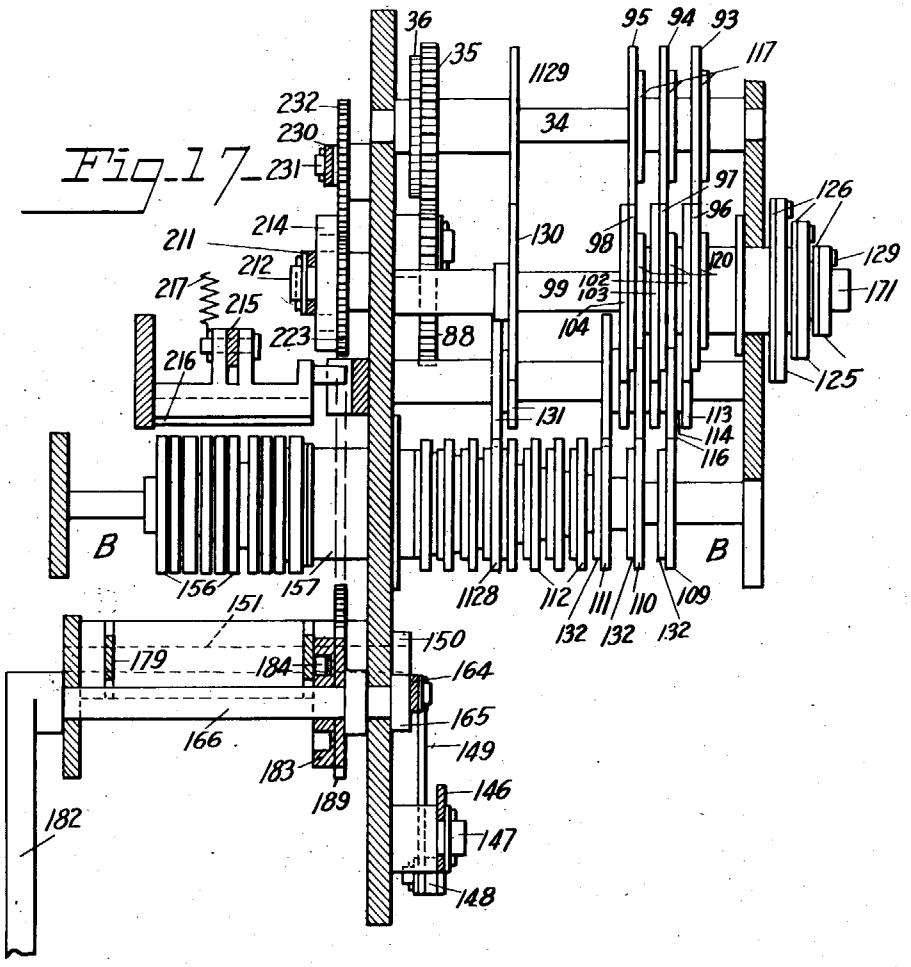
Figure 18:
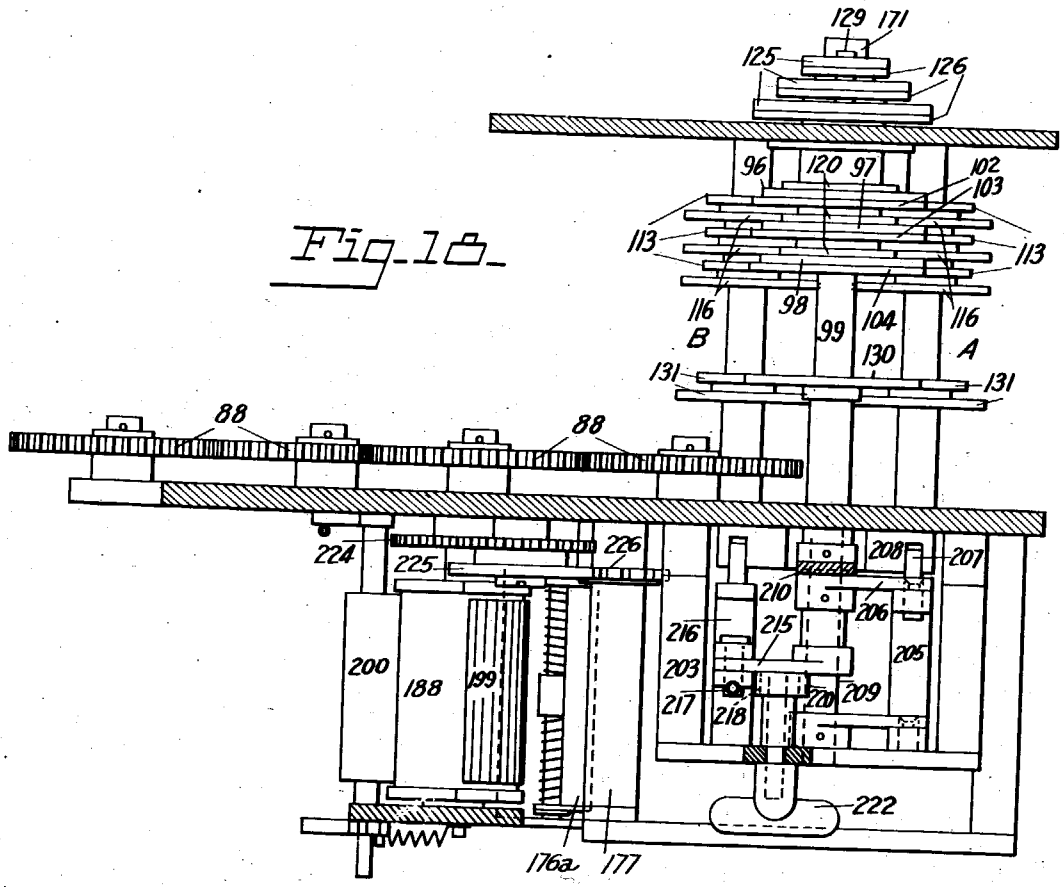
Figures 19, 39, 40:
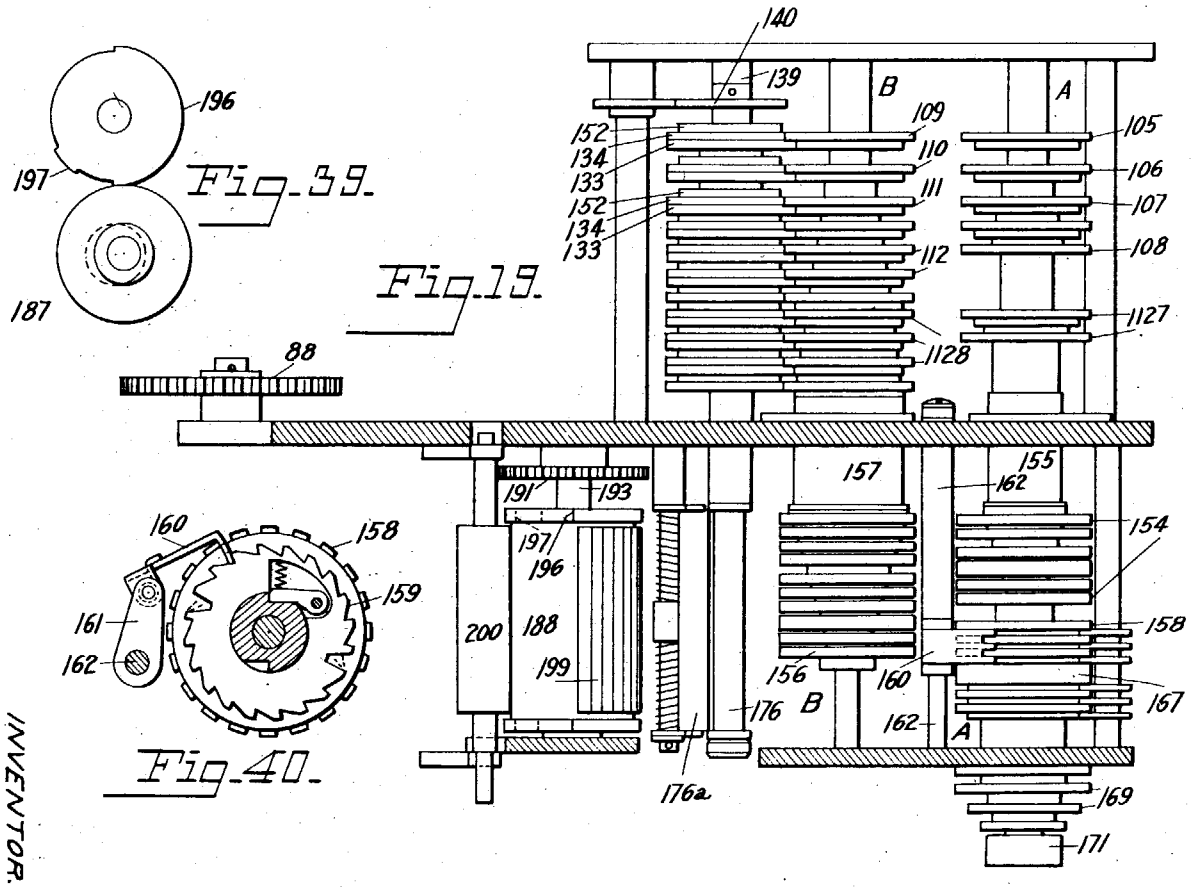
Figure 20:
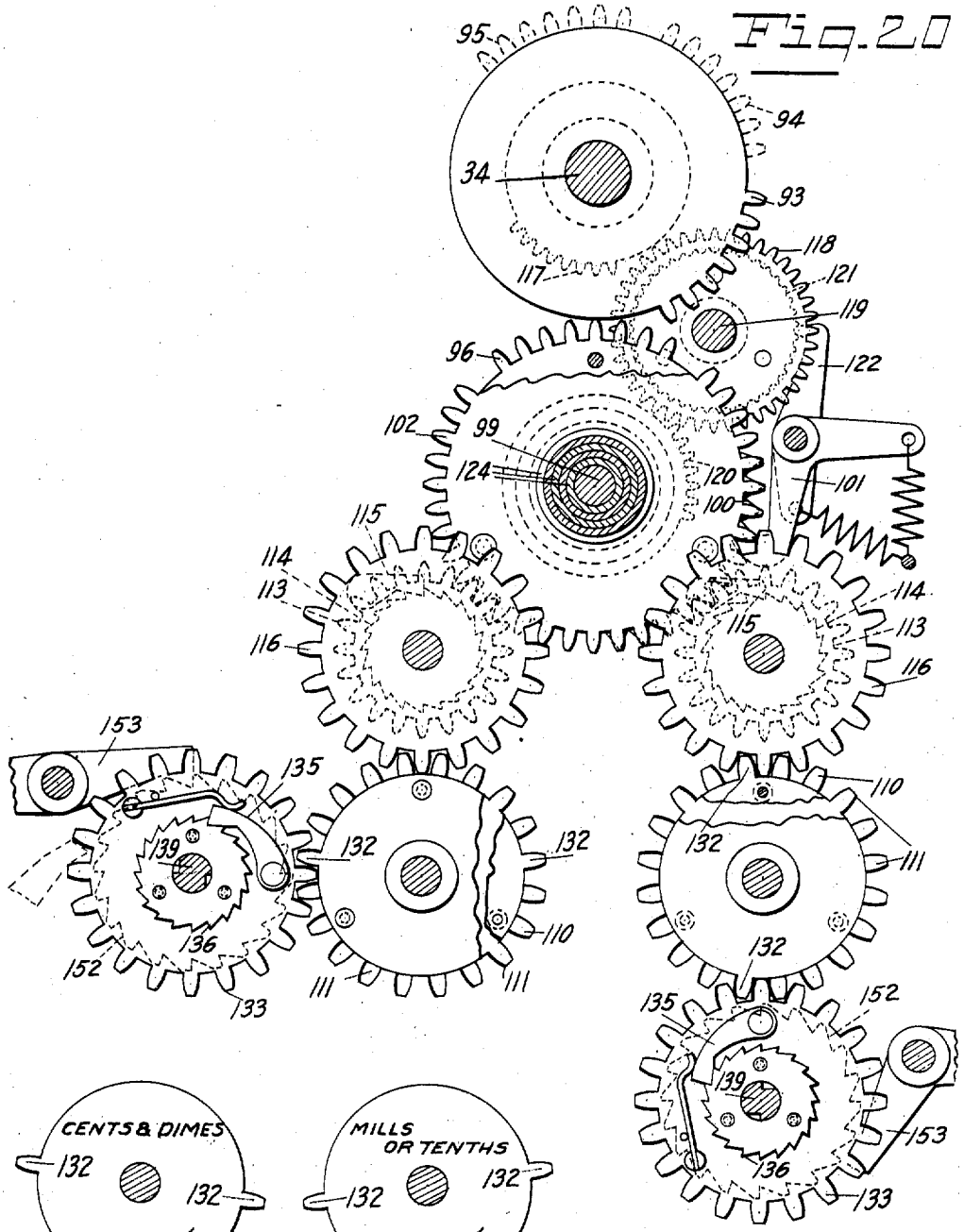
Figure 41:
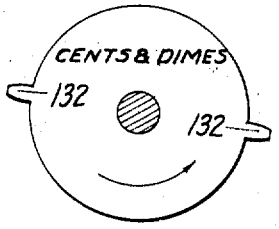
Figure 42:
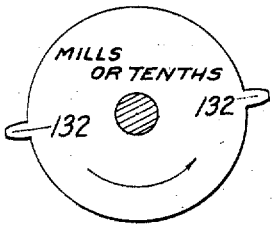

In the accompanying drawings Fig. 1 is a side elevation, partly in section, of the lower portion of the housing of a dispensing apparatus embodying my invention; Fig. 2 is a detail of a portion of the connecting mechanism between the motor and the pump; Fig. 3 is a side elevation, partly in section, of the upper portion of a dispensing apparatus embodying my invention; Fig. 4 is a sectional view of the mechanism for controlling the filling and emptying of the measuring receptacles; Fig. 5 is a side elevation, partly in section, of the spring motor; Fig. 6 is a detail view of the pawl and ratchet connection between the pump operating mechanism and the spring motor, showing the pawl in operative position; Fig. 7 is a similar view showing the pawl in its inoperative position; Fig. 8 is a plan view of the spring motor and the connecting devices therefor; Fig. 9 is a sectional detail view, on the line 9—9 of Fig. 8, showing the pawl and ratchet mechanism for connecting this spring motor with the pump operating mechanism; Fig. 10 is a sectional detail view, on the line 10—10 of Fig. 8, showing the pawl and ratchet mechanism for connecting the spring motor with the registering device; Fig. 11 is a section taken on the line 11—11 of Fig. 10; Fig. 12 is a side elevation of a casing enclosing the registering and printing mechanism; Fig. 13 is a side elevation of that side of said casing opposite that shown in Fig. 12; Fig. 14 is a sectional view taken just inside the casing showing the registering mechanism in elevation; Fig. 15 is a side elevation, partly in section, of the printing mechanism; Fig. 16 is a sectional view taken on the line 16—16 of Fig. 14; Fig. 17 is a sectional view taken on the line 17—17 of Fig. 14; Fig. 18 is a horizontal sectional view taken on the line 18—18 of Figs. 14 and 15; Fig. 19 is a horizontal sectional view taken on the line 19—19 of Figs. 14 and 15; Fig. 20 is an enlarged sectional view of the registering mechanism taken on the line 20—20 of Fig. 16; Fig. 21 is a detail view of the actuating device; Fig. 22 is a section taken on the line 22—22 of Fig. 21; Fig. 23 is a section taken on the line 23—23 of Fig. 21; Fig. 24 is a section taken on the line 24—24 of Fig 21; Fig. 25 is a section taken on the line 25—25 of Fig. 21; Fig. 26 is a longitudinal sectional view of the price selecting device; Fig. 27 is a section taken on the line 27—27 of Fig. 26; Fig. 28 is a section taken on the line 28—28 of Fig. 26; Fig. 29 is an end elevation of the setting dials for the price selecting device; Fig. 30 is a detail view of the intermediate gears for the resetting mechanism of the price selecting device;

Fig. 31 is a sectional detail of the intermediate gears between the price selecting device and the counter gears; Fig. 32 is a section taken on the line 32—32 of Fig. 31; Fig. 33 is a longitudinal sectional view of the total counter; Fig. 34 is a longitudinal sectional view of the transfer mechanism for the total counter; Fig. 35 is a transverse sectional view taken on the line 35—35 of Figs. 33 and 34, showing the gears in mesh; Fig. 36 is a transverse sectional view taken on the line 36—36 of Fig. 34; Fig. 37 is a longitudinal sectional view of the transaction counter; Fig. 38 is a longitudinal sectional view of the transfer mechanism for the transaction counter; Fig. 39 is an end elevation of the paper feeding rollers for the printing mechanism; Fig. 40 is an end elevation of the consecutive number counters and their actuating pawl; Fig. 41 is a detail view of the transfer gear for the cents counter; Fig. 42 is a detail view of the transfer gear for the mills counter; Fig. 43 is a facsimile of the ticket; and Fig. 44 is a facsimile of a portion of the record.

In these drawings I have illustrated one embodiment of my invention and have shown the same in connection with a gasoline dispensing pump comprising twin measuring receptacles to be alternately filled and emptied. It will be understood, however, that the mechanism may take various forms and may be used with dispensing apparatus of various kinds without departing from the spirit of the invention.

The dispensing apparatus here illustrated comprises a vertical standard or housing 1 at the upper end of which are mounted two measuring receptacles, 2 and 3, which are here shown in the form of glass cylinders of identical size, each having a capacity of one gallon or other suitable measuring unit. Each receptacle has at its upper end a vent 4, the vents of the two receptacles being connected by a pipe 5. Each vent is controlled by a valve 6 which is connected with a float 7 so arranged that when the receptacle is filled the float will close the valve. Mounted in the lower portion of the standard or housing 1 is a pump 8 which may be operated in any suitable manner. In the present instance it is motor driven and is connected by a pitman 9 with an electric motor 10, through suitable reducing gearing contained within the casing 11. The inlet of the pump is connected by a pipe 12 with a suitable source of liquid supply, such as an underground reservoir, and the outlet of the pump is connected by a pipe 12a with an inlet conduit 13 formed in the casing 14 constituting the upper part of the standard and on which the twin receptacles 2 and 3 are mounted. This inlet conduit 13 is provided with branches 15 and 16 leading respectively to valve chambers 17 and 18 which are connected with the respective measuring receptacles by passageways 19 and 20. The valve chambers are also connected at their inner ends with an outlet conduit 21 the outer end of which is connected with a discharge pipe 22. Mounted in each valve chamber is a piston valve, 23 and 24, the two valves being rigidly connected by a rod 25 so that they will move in unison and being so arranged that when moved to the limit of their movement in one direction the measuring receptacle 2 will be connected with the discharge pipe and the measuring receptacle 3 will be connected with the inlet or supply pipe. When the valve is shifted to the other limit of its movement the measuring receptacle 2 will be connected with the inlet or supply pipe and the measuring receptacle 3 will be connected with the discharge pipe. Arranged between the two passageways 19 and 20 is a cylinder 26 having mounted therein a double ended piston 27 the ends of which are exposed to the liquid in the respective passageways. When that receptacle which is connected with the supply pipe is filled the continued operation of the pump will subject the liquid to pressure sufficient to shift the piston 27 lengthwise of the cylinder 26. Connected with the piston 27 is a crank arm 28 rigidly secured to a shaft 29 which extends through the outer wall of the casing 14 and is connected with the valves 23 and 24 in such a manner as to shift those valves. As here shown, an arm 30 is secured to the outer end of the shaft 29 and is connected with a second arm 31 which is connected with an arm 31a rigidly secured to a shaft 32 also extending through the wall of a casing and having secured to its inner end an arm 33 which is connected with a valve rod 25. The arms 30 and 31 constitute in effect a toggle and the arm 31 is longitudinally movable in a part 34 which is connected with the arm 31a and is acted upon by a spring 35, the arrangement being such that when the two arms are brought into longitudinal alinement the spring will be compressed and when the arms are moved beyond their alined positions the spring will expand to complete the movement of the arms thus completely shifting the valves. This particular dispensing apparatus forms no part of the present invention except in so far as it enters into combination with the recording mechanism and the controlling devices therefor, and therefore it need not be described in detail. A full description of a dispensing apparatus of this type will be found in Patent No. 1,612,488, granted December 28, 1926 to Carbanaro.

The recording apparatus may be mounted in any suitable relation to the dispensing apparatus and, in the present instance, it is arranged in the upper part of the housing 1 which is below the casing 14. This recording mechanism comprises an actuating device to which a predetermined movement is imparted upon each operation of the valves which control the filling and emptying of the measuring receptacles. In the present instance this actuating device comprises a shaft 34 (see Figs. 14 and 16), having secured thereto a gear 35 and a ratchet wheel 36 which is engaged by a pawl 37 to hold the shaft against reverse movement. Movement is imparted to this actuating device from a motor, preferably a spring motor, the operation of which is controlled by the valve reversing mechanism so that a predetermined movement will be imparted to the actuating device on the discharge of each measured unit of liquid. In the particular form of apparatus here illustrated, the motor comprises a helical spring 38 confined in a cylindrical casing 39 and acting on one end of a rack bar 40. The rack bar has an extension or stem 41 extending into the casing 39 and about which the spring is mounted, and also has an annular shoulder 42 against which the outer end of the spring abuts. Meshing with the rack 40 is a pinion 43 rotatably mounted on a shaft 44 carried by a supporting structure or frame 45 which is mounted on the housing 1. Rigidly secured to the pinion 43 is a disk 46 having mounted thereon a pawl 47 adapted to engage a ratchet wheel 48 which is rigidly secured to the shaft 44 so that the rotation of the ratchet wheel 48 will cause the same to pick up the pawl and disk and rotate the pinion 43 in a direction to compress the spring 38 of the motor. Rigidly connected with the shaft and with the ratchet wheel 48 is a second ratchet wheel 49 to which movement is imparted from the pumping mechanism. As here shown, two pawl carrying arms, 50 and 51, are mounted for pivotal movement about the axis of the shaft 44, extend at an angle one from the other and have mounted thereon pawls 52 and 53 which engage the ratchet wheel 49. The pawl carrying arm 50 is connected by a link 54 with one arm 55 of the three arm lever. The pawl carrying arm 51 is connected by a link 56 with a second arm 57 of said three arm lever. This three arm lever is pivotally mounted at 58 on the frame 45 and the arms 55 and 57 are so arranged with relation to the pawl carrying arms that when the lever is moved in one direction one pawl will actuate the ratchet wheel and when the lever is moved in the other direction the other pawl will actuate the ratchet wheel, thus causing a practically continuous movement to be imparted to the ratchet wheel and to the pinion which is connected therewith. The third arm 59 of the three arm lever is connected by a pitman 60 with a link 61 carried by a pivoted arm 62 and connected with one end of a lever 63 which is pivotally mounted between its ends, as shown at 64, and is connected at its other end with the pitman 9 of the pump operation mechanism. In this manner the ratchet wheel 49 is operated continuously while the pump is in operation.

When the rack bar 40 has been moved to the desired position and the motor spring compressed to the desired extent the ratchet wheel 48 is disconnected from the pinion 43, thus permitting the pump to continue its operation without affecting the spring motor. This is accomplished in the present instance by providing the pawl 47 with a tail 65 carrying a roller 66 arranged to engage a yieldable stop 67 which is so positioned that it will engage the roller of the pawl when the ratchet wheel 49 has been moved a distance sufficient to impart the desired movement to the rack bar. This contact of the stop with the roller on the pawl will move the pawl to its inoperative position, thus permitting the ratchet wheel 48 to rotate with relation thereto. Preferably the pawl 47 is provided with means for retaining the same in either its operative or inoperative position. To this end I have here shown an arm 68 pivotally mounted on the disk 46 and having at its free end a laterally extending part 69 carrying a roller 70 which extends into a recess or seat 71 on the end of the pawl 47. A spring 72 is connected with the arm 68 and with the tail 65 of the pawl and is so arranged that when the pawl is moved from one position to the other the point of connection between the pawl and the arm 68 will be moved across the line of the spring and the spring will thus retain the pawl in the position to which it has been moved.

Means are also provided for retaining the rack bar in the position to which it has been moved, against the action of the spring 38, and this means is so arranged that it will engage the rack bar just before the pinion is disconnected from the pumping mechanism. As here shown, the locking means comprises a dog 73 pivotally mounted at one side of the rack bar and acted upon by a spring 74. The nose of the dog will ride upon the edge of the rack bar until the end of the bar passes the same and will then spring into engagement with the recess in the end of the bar and lock the same against movement. This locking device or dog is controlled by the filling and emptying mechanism for the measuring receptacle and I have here shown a trip finger 75 arranged to engage the dog and move the same into an inoperative position. This trip finger is connected with an actuating arm 76 which in turn is connected by a pitman 77 with one arm of a bell crank lever 78, the other arm of which is connected with one arm of a toggle 79, the other arm of the toggle being rigidly secured to the shaft 29. Consequently whenever the shaft 29 is actuated to shift the controlling valves the dog will be moved to its inoperative position and the rack bar released for operation by the spring 38. The movement of the rack bar by the spring rotates the pinion 43 and disk 46 in a reverse direction and brings the pawl 47 to such a position that it will be engaged by a projection or lug 80 carried by the actuating bar and thus forced again into contact with the ratchet wheel 48. The pawl is preferably provided with a roller 81 with which the lug 80 contacts. The lug is so arranged that it will engage and operate the pawl just as the rack bar completes its movement, thus reestablishing the connection between the pinion 43 and the pumping mechanism and causing the spring 38 to be again placed under compression.

The rack bar also meshes with a pinion 82 rotatably mounted on a shaft 83 journaled in suitable bearings on the supporting structure 45. Rigidly connected with this pinion 82 is a ratchet wheel 84, here shown as a one tooth ratchet wheel. Rigidly mounted on the shaft 83, adjacent to the ratchet wheel 84, is a disk 85 which carries a pawl 86 which engages the ratchet wheel 84, the arrangement being such that when the pinion 82 and ratchet wheel 84 are actuated by the rack bar, under the influence of the spring 38, the ratchet wheel will engage the pawl 86 and impart rotation to the disk 85. Rigidly secured to the disk 85 is a gear 87 which is connected by a train of gears 88 with the actuating gear 35 of the registering mechanism. The movement of the rack bar 40 under the influence of spring 38 is so limited that it will impart a single complete rotation to the gear 87, and the ratio of the gearing connecting gear 87 with the actuator gear 35 is such that one complete rotation will be imparted to the actuator gear.

Preferably some means is provided to retard the movement of the rack bar by the spring and thus prevent the too rapid operation thereof and the violent contact between the parts. As here shown, I have utilized a dash pot consisting of a fluid cylinder 89 in which is mounted a piston 90 connected by a piston rod 91 with a lug 92 on the rack bar, the arrangement being such that the fluid will escape slowly past the piston and thus retard the movement of the rack bar.

The recording mechanism comprises two separate registering devices, one of which registers items relating to each individual transaction and the other of which registers a total of the items relating to all transactions within any desired period of time. The transaction register is indicated as a whole by the letter "A" and the total register is indicated as a whole by the letter "B". Both the registers are operated simultaneously by the same actuating device so that the same record of each transaction is accumulated on each register. The transaction register is reset to zero after each transaction while the total register is reset to zero only at such times as it may be desired by the person in control of the apparatus. As has been explained, the actuator shaft 34 is rotated by the spring motor through one complete rotation upon the discharge of each measured quantity of liquid. Rigidly secured to this shaft are three mutilated gears or actuating segments 93, 94 and 95. The segment 93 being the mills actuator, the segment 94 the cents actuator and the segment 95 the tens actuator. Each of said segments comprises a portion of a forty tooth gear and has seven teeth. The several segments are arranged in staggered relation one to the other, that is, they occupy different radial positions so that they will function successively. The mills segment will operate first, then the cents segment, and then the tens segment, the functioning of the three segments requiring a rotation of about two hundred degrees.

Interposed between the actuator segments and the two registering devices A and B is a price selecting device by means of which the predetermined movement of the actuator may be caused to impart movement to the counter gears of the registering device according to a predetermined price per unit. As here shown this price selecting device comprises three mutilated gears or toothed segments 96, 97 and 98, rotatably mounted on a shaft 99. Each of the selector segments, (see Figs. 26 and 27), comprises a portion of a forty tooth gear and has eight operating teeth arranged to be engaged by the teeth of the corresponding actuator segments. Each selector gear also has a second set of teeth 100 adapted to be engaged by a yieldable pawl 101 which serves to properly aline the segments and hold the same against accidental displacement. Rigidly secured to the respective selector gears are full forty tooth gears 102, 103 and 104, which are connected through intermediate gear units with the counter gears of the respective registers. It may be here noted that the transaction register A (Fig. 37), comprises a mills counter gear 105, a cents counter gear 106, a tens counter gear 107, and such additional counter gears 108 as may be necessary to accumulate the computation thereon relating to any single transaction. The total counter B comprises a mills counter gear 109, a cents counter gear 110, a tens counter gear 111 and such additional counter gears 112 as may be necessary to accommodate the total of the several transactions. The gear connections between the full tooth selector gears and the corresponding counter gears may be of any suitable character but, in the present instance, I have employed a flexible gear unit which will permit the counter gears to be reset to zero without displacing the selector gears. As here shown, each gear unit comprises a gear 113 which meshes with the corresponding full tooth selector gear. Rigidly secured to the gear 113 is a ratchet wheel 114, (see Figs. 31 and 32), which is engaged by a spring pressed pawl 115 carried by a gear 116 which meshes with the corresponding counter gear. The arrangement of the pawl and ratchet wheel is such that when the gear 113 is actuated by the selector gear the ratchet wheel will pick up the pawl and rotate the gear 116 but when the counter gear is rotated independently of the selector mechanism, in resetting the register to zero, the pawl will ride over the ratchet wheel and no movement will be imparted to the gear 113 or to the selector mechanism. The intermediate gear units for the transaction register and the total register are identical and the same reference numerals have been applied to both. The actuator segments being arranged in staggered relation will successively engage the selector segments, which are arranged substantially in axial alinement and movement will be transmitted successively to the several counter gears.

The selector segments and gears are returned to their initial positions prior to the completion of each operation of the actuating mechanism, the yieldable connection between the two gears of each intermediate gear unit permitting the actuator gears to turn in a reverse direction without transmitting movement to the counter gears. Each of the actuator gears 93, 94 and 95, has rigidly secured thereto a mutilated gear or toothed segment 117 of shorter radius than the actuator segment. The segments 117 are arranged in longitudinal alinement one with the other and are radially arranged beyond the last of the actuator segments so that they will function after the actuator segments have all functioned. Each of the segments 117 is arranged to engage a corresponding gear 118 mounted on the shaft 119 and each of the gears 118 is arranged to engage and actuate a mutilated gear or toothed segment 120 connected with the corresponding selector segments 96, 97 and 98. Rigidly secured to each of the intermediate gears 118 is a toothed wheel 121 which is engaged by a pawl 122 to aline the respective intermediate gears and hold the same against accidental displacement. It will be apparent, therefore, that after the several actuator segments have functioned to impart movement through the selector segments to the counter gears the resetting segments 117 of the actuator mechanism will operate through the intermediate gears to rotate the selector segments in a reverse direction and thus restore the same to their initial positions.

The price per unit upon which the computation is based may be varied by shifting the positions of the actuator segments 96, 97 and 98, with relation to the corresponding segments 120. The resetting mechanism being such that the resetting segments 120 will be returned always to the same position, it will be apparent that if the selector segments are shifted with relation thereto a different number of teeth on the selector segment may be caused to be engaged by the actuator segments, and consequently a different amount of movement imparted to the counter gears. As here shown, (see Fig. 26), the several selector segments and the corresponding resetting segments 120 are rigidly secured to telescoping sleeves 123 and 124. Each pair of sleeves, carrying the corresponding selector segment and resetting segment, are normally held against rotation with relation one to the other but are rotatable with relation to each other pair of sleeves. These sleeves project beyond the side of the casing enclosing the mechanism and each sleeve 123 has secured thereto a laterally extending part, such as a disk 125, and each sleeve 124 has secured thereto a laterally extending part, such as a disk 126. Each pair of disks 125 and 126 are adjustably connected one to the other, this being accomplished in the present instance by providing each disk with an annular series of holes 127 and 128 adapted to receive a screw 129. The holes in each pair of disks are so arranged that very fine adjustments may be secured by bringing selected openings in the two disks into line one with the other and then inserting the screw 129 to rigidly secure the disks in adjusted positions. It will be apparent that the adjustment of the disks will also adjust the selector segments with relation to the resetting segments 120. The disks may be provided with graduations to facilitate the adjustment thereof. It will be understood that this adjustment of the selector disks is made only when the price per unit of the commodity being dispensed changes and that so long as the price remains fixed no adjustment of the selector disks is necessary.

Both the transaction register and the total register are adapted to register the number of gallons, or other unit of measurement, of liquid dispensed and to this end the transaction register A is provided with a counter comprising a gear 127 and the total counter is provided with a counter comprising a counter gear 128, each counter including such additional counter gears as may be desirable. Rigidly secured to the actuator shaft 34 is a one toothed gear 129 which meshes with a full toothed gear 130 on the shaft 99 of the price selecting device, and the gear 130 is connected by flexible gear units 131, such as that above described, with the respective counter gears 127 and 128. Inasmuch as the actuator shaft makes one complete rotation for each gallon of liquid discharged the gallons counter will be advanced one point upon the discharge of each gallon of liquid.

The count may be transferred from each counter gear of lower denomination to the counter gear of next higher denomination in any suitable manner and, in the present instance, I have employed a well known one toothed transfer mechanism. The transfer mechanism for the transaction register is shown in Figs. 14, 20 and 38, and the transfer mechanism for the total register is shown in Figs. 14, 20 and 34. These transfer mechanisms are substantially identical except that the transaction register is reset to zero through mechanical connection with the printing mechanism, to be hereinafter described, while the total counter is reset to zero manually. In the present registers the counters are twenty point counters and therefore each counter gear has secured thereto a two toothed transfer gear 132 each tooth of which will engage a twenty tooth gear 133 and advance the same one tooth once upon each complete rotation of the counter gear, thus causing the gear 133 to be advanced two teeth upon each rotation of the counter gear. Each gear 133 is connected with a second gear 134 which meshes with the counter gear of next higher denomination, thereby advancing that counter gear the same number of teeth which the gear 133 has been advanced. Inasmuch as the mills, cents and tens counter wheels are each separately actuated it is necessary that the transfer mechanism shall be of such a character that it will not only transfer the count from the counter of lower denomination to the counter of higher denomination but will permit the counter of higher denomination to be advanced independently of the counter of lower denomination. In the transfer devices for these counter gears I have therefore interposed a pawl and ratchet connection between the gears 133 and 134. A pawl 135 is carried by the gear 133 and engages the ratchet wheel 136 secured to the gear 134, the arrangement being such that the rotation of the gear 133 in a forward direction will be transmitted to the gear 134, and when the gear 134 is advanced independently of the gear 133 the ratchet wheel will ride past the pawl without imparting movement to the gear 133.

Each registering device is provided with means for resetting the counter gears to zero and this resetting mechanism is preferably embodied in the transfer mechanism. To this end each gear 134 has mounted thereon a pawl 137, the gear being preferably provided with a gear 138 to receive the pawl. The transfer shaft, shown at 139 in Fig. 36, is provided with a longitudinal groove or spline so arranged that when the gear is rotated in a forward direction the pawl will ride over the spline but when the shaft is rotated in a forward direction the spline will engage the end of the pawl and cause the gear to rotate with the shaft. The resetting of the total counter is manually controlled through key controlled mechanism and, as shown in Fig. 34, the transfer shaft has rigidly secured thereto a gear 140 which meshes with a gear 141 carried by a rotatable part of a lock 142 mounted in the wall of the casing 143 and controlled by a key 144. The shaft of the transfer mechanism for the transaction counter has secured thereto a pinion 145, (see Figs. 14 and 38), with which meshes a toothed segment 146 pivotally mounted at 147 for oscillatory movement and having secured thereto an arm 148 which is connected by a link 149 with a crank 150 rigidly secured to a shaft 151 which is controlled by the operation of the printing mechanism in the manner to be hereinafter described, the operation being such, however, that the shaft 151 will make a complete rotation upon each printing operation. The transfer mechanism is held against reverse movement by the usual pawl and ratchet wheel and, as here shown, each gear 134 has secured thereto a ratchet wheel 152 which is engaged by a detent pawl 153. The transfer mechanism for the mills counter is so arranged that it will function between the zero position and the one position. (Figs. 20 and 42.) This is done for the reason that any fraction of a cent is added into the computed price as one cent. The transfer mechanisms for the remaining counters function between the nine position and the zero position.

The several counter gears of the registering devices are connected with printing counters or type wheels. The type wheels for the transaction register, A, are indicated as a whole by the reference numeral 154 and are connected with the respective counter gears by telescoping sleeves 155. The type wheels for the total counter B are indicated as a whole by the reference numeral 156 and are connected with the corresponding counter gears by telescoping sleeves 157. It will be observed that the mills counter gears are not provided with type wheels because the count of mills is not registered as such but is added into the cents counter. The type wheels are twenty point wheels and each has two series of type numerals from 0 to 9 inclusive. This duplication of the numerals of the type wheels enables two separate but identical records to be printed simultaneously from the type wheels, as will hereinafter appear.

If desired the transaction register may be provided with a consecutive numbering and dating device. As shown more particularly in Fig. 37 the consecutive numbering device comprises three type wheels 158 mounted in axial alinement with the type wheels 154 and each having rigidly connected therewith a ratchet wheel 159. In the present instance, the consecutive numbering device is actuated through the printing mechanism and the actuating means comprises a pawl 160 carried by a crank arm 161. This pawl has three prongs of different lengths and the units and tens ratchet wheels are provided at the zero position with relatively deep notches. The longer prong of the pawl rests upon the units ratchet wheel and supports the other prongs out of engagement with their ratchet wheels. When the units type wheel reaches the tens position the deep notch will be brought into line with the long prong of the pawl thus allowing the second prong to drop into engagement with the tens ratchet wheel, thereby advancing that wheel one notch upon the next operation of the pawl. The hundreds ratchet wheel is operated by a third prong in the same manner. The crank arm 161 which carries the pawl is secured to a shaft 162 to which is connected an arm 163, the opposite end of which is connected by a link 164 with a crank arm 165 rigidly secured to a shaft 166 forming part of the printing mechanism, the connection being of such a character that operative movement will be imparted to the pawl upon each operation of the printing mechanism.

The dating device comprises type wheels 167 also arranged in axial alinement with the type wheels 154 and 158 and connected by means of telescoping sleeves 168 with dials 169 by means of which they may be set to print the desired date. The consecutive number type wheels are here shown as mounted upon a tubular shaft 170 which extends through the telescoping sleeves 168 of the date type wheels and is provided at its outer end with a knob 171 by means of which it may be rotated. Interposed between this shaft and the consecutive number type wheels is a resetting device, such as that above described, so that the consecutive number type wheels are reset independently of the other type wheels.

The present printing mechanism, shown as a whole in Fig. 15, prints two separate records, one of which is issued as a ticket and is preferably printed in duplicate so that it may be divided and one part given to the customer as a receipt and the other retained by the operator. This ticket is shown in Fig. 43. The second record includes a detailed record of each transaction and a total of all transactions. A portion of this record is shown in Fig. 44. Two separate printing devices are provided for taking these records, the ticket being printed from the lower side of the transaction type wheels, the detail items on the other record being printed from the upper side of the transaction type wheels and the total being printed from the upper side of the total type wheels.

Arranged beneath the type wheels is a paper guide or chute 172 through which is threaded a web of paper 173. The paper guide is provided with an opening 174 directly beneath the transaction type wheels 154. Preferably an ink ribbon is interposed between the web of paper and the type wheels and I have shown an endless ink ribbon 175 extending about guides 176 and 177. The guide 177 is in the form of an ink impregnated roller which also acts as a driving member to shift the ribbon. A tension roller 176a bears against the ribbon to maintain the same taut. Arranged beneath the transaction type wheels and operating through the opening 174 in the paper guide is a platen 178 which is carried by the free end of a pivoted frame 179 mounted for oscillatory movement about the axis of the shaft 151. Laterally extending lugs or pins 180 operate in guideways 181 to guide the platen toward and from the type wheels. The frame 179 extends above the shaft 166, which is the main operating shaft for the printing mechanism and has secured thereto a handle 182 by means of which it may be rotated. Rigidly secured to the shaft 166 is a box cam 183, the groove of which is adapted to receive a projection or pin 184 carried by one arm of the frame 179. The cam groove is so shaped that one complete rotation of the shaft 166 will impart two separate movements to the platen and thus cause two impressions to be taken from the type wheels. The paper 173 is advanced on each operation of the handle 182 a distance sufficient for the formation of the ticket, the feeding movement being interrupted to permit of the taking of the impressions. As here shown, the web 173 is carried from a roll 185 about a guide 186 and between feed rolls 187 and 188. The feed rolls are actuated from the shaft 166 through a train of gearing comprising a gear 189 on the shaft 166, a gear 190 on the shaft 151 and gear 191 secured to the feed roller 187 and a gear 192 secured to the feed roller 188, these gears being of such a ratio that a complete rotation of the handle 182 will impart a single rotation to each of the feeding rollers. Preferably the lower roller 187 is of soft rubber or similar material and is here shown as mounted on a shaft 193 having an eccentric portion which carries the roller and which may be adjusted to position the roller 187 with relation to the roller 188. A locking plate 194 is secured to the outer end of the shaft 193 and slotted to receive a screw 195 by means of which it may be secured in adjusted positions. The feed roller 188 is provided at its ends with circumferential flanges to press the paper against the yieldable roller 187 and cause the same to be advanced when the rollers are actuated. The feeding flanges of the roller 188 are each divided into two parts separated one from the other to interrupt the movement of the paper and permit the impression to be taken. The longer portions of the flanges, as shown at 196, advance the paper a major portion of the required distance while the shorter portions of the flanges 197 advance the paper only far enough to space apart the two impressions. After the impressions have been taken the main portion of the web is torn off along the knife 198. If desired, an electro-type may be mounted on the roller 188 between the flanges, as shown at 199, to print on the ticket any desired indications. A spring actuated ink roll 200 is arranged to contact with this electrotype and ink the same as the feed rollers rotate.

The detail and total record is printed on a web of paper 201 which is carried from a supply roll 202 about guides 203 above the ink ribbon 175 to a rewinding roller 204. A platen 205 arranged above the transaction type wheels is carried by a frame 206 and guided by pins or projections 207 traveling in guideways 208. The supporting arm 206 is rigidly secured to a shaft 209 having connected therewith a crank arm 210 which is connected at one end with a pitman 211. The other end of the pitman is slotted to embrace a shaft 212, which acts as a guide for the same, and has a laterally extending projection or pin 213 extending into the groove of a box cam 214, the shape of the cam groove being such that each rotation of the shaft 212 will impart an operative movement to the platen 205, thereby causing an impression to be taken from the transaction type wheels. Loosely mounted on the shaft 209 is an arm 215 on the outer end of which is supported a platen 216 which is normally held in an elevated position by a spring 217. The platen 216 is arranged above the total type wheels 156 and adapted to print the total record on the record strip. The arm 215 has a laterally extending projection 218 arranged in the path of a cam 220 carried by a shaft 221 which extends laterally beyond the printing mechanism and is provided with an operating handle 222 by means of which it may be rotated to cause an impression to be taken from the type wheels. The shaft 212 and cam 214 are connected with a gear 223 which meshes with a gear 224, this latter gear also meshing with the gear 192 of the paper feeding roller 188, the gears being of such ratio that the platen 205 will be actuated to cause a single impression to be made upon each complete rotation of the handle 182.

The gear 224 has connected therewith a one tooth gear 225 adapted to engage a gear 226 connected with the feeding roller 177 for the ink ribbon, so as to advance that ribbon one step on each operation of the handle 182.

The record strip 201 is preferably automatically rewound upon the rewinding roller 204. As here shown, that roller is provided with a ratchet wheel 227 which is engaged by a pawl 228 carried by an arm 229 mounted for pivotal movement about the axis of the roller and connected by a link or pitman 230 with a crank pin 231 on a gear 232 meshing with the gear 223, the arrangement being such that the rewinding roller will advance the paper one step on each printing operation. The rewinding roller is held against reverse movement by a pawl 233 which engages the ratchet wheel 227. The rewinding roller may be manually actuated to advance the same after a total record has been printed so as to carry the total record beyond the printing point at the transaction counter and to this end it is provided at its outer end with a handle or finger piece 234.

The operation of the mechanism as a whole will be readily understood from the foregoing description and it will be apparent that when the pump is set in operation the liquid will be delivered to and discharged from the twin measuring receptacles alternately, the liquid itself serving to effect the reversal of the valve mechanism which controls the discharge. The operation of the pump will actuate the spring motor to place the spring thereof under compression and when the valve reversing mechanism operates to cause the discharge of liquid from one of the receptacles it releases the spring motor and permits the same to actuate the registering device. The operation of the registering device causes the gallon or other unit of liquid so discharged to be registered and causes the money value of that gallon or unit to be added on both the transaction register and the total register. When the registration has been effected the price selecting mechanism is automatically returned to its initial position. Upon the completion of delivery of liquid to a customer the operator actuates the printing mechanism to print the ticket which, in the present instance, shows the number of gallons delivered, the money value thereof and the date and also bears a consecutive number. This operation of the printing mechanism also causes a detail record to be printed on the record strip showing the number of gallons delivered, the money value thereof and the consecutive number, thus connecting each detail record with the corresponding ticket. At the end of the day, or such other times as may be desired, the operator or proprietor may cause a total record to be printed on the record strip at the end of the detail record and may, if he desires, remove that record from the machine.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a liquid dispensing apparatus comprising a measuring receptacle, a pump to fill said receptacle, operating mechanism for said pump, and means to control the discharge of liquid from said receptacle, a price computing and registering device, a spring for actuating said device to cause it to register the money value of the liquid discharged from said receptacle, means actuated by said pump operating mechanism to compress said spring, and means controlled by said controlling means to cause said spring to actuate said computing and registering device.

2. In a liquid dispensing apparatus comprising a measuring receptacle, a pump to fill said receptacle, operating mechanism for said pump, and means to control the discharge of liquid from said receptacle, a price computing and registering device, a spring for actuating said device to cause it to register the money value of the liquid discharged from said receptacle, means actuated by said pump operating mechanism to compress said spring, means to retain said spring in its compressed condition, and means controlled by said controlling means to release said spring.

3. In a liquid dispensing apparatus comprising twin measuring receptacles to be alternately filled and emptied, a pump to fill said receptacles, operating mechanism for said pump, and means to control the filling and emptying of said receptacles, a registering device, a spring to actuate said device, means actuated by said pump operating mechanism to place said spring under compression, and means connected with said controlling means to control the action of said spring on said registering device.

4. In a liquid dispensing apparatus comprising a measuring receptacle, means for filling said receptacle and means to control the emptying of said receptacle, a registering device, a spring to actuate said registering device, means controlled by said filling means to place said spring under compression, and means controlled by said controlling means to control the action of said spring on said registering device.

5. In a liquid dispensing apparatus comprising a measuring receptacle, means for filling said receptacle and means to control the emptying of said receptacle, a registering device, a spring to actuate said registering device, means controlled by said filling means to place said spring under compression, a detent to retain said spring under compression, and means controlled by said controlling means to release said spring.

6. In a liquid dispensing apparatus, a measuring receptacle, a pump to fill said receptacle, operating mechanism for said pump, and means to control the discharge of liquid from said receptacle, a register, a spring to actuate said register, means operatively connected with said pump operating mechanism to place said spring under compression, means to render said compressing means inoperative when said spring has been compressed to a predetermined extent, and means connected with said controlling means to control the action of said spring on said register.

7. In a liquid dispensing apparatus comprising a measuring receptacle, a pump to fill said receptacle, operating mechanism for said pump, and means to control the discharge of liquid from said receptacle, a register, a spring to actuate said register, a movable member to connect said spring with said register, an operative connection between said movable member and said pump operating mechanism to compress said spring, means to interrupt said connection when said spring has been compressed to a predetermined extent, and means connected with said controlling means to control the action of said spring on said register.

8. In a liquid dispensing apparatus comprising a measuring receptacle, a pump to fill said receptacle, an operating mechanism for said pump, and means to control the discharge of liquid from said receptacle, a register, a spring to actuate said register, a movable member to connect said spring with said register, an operative connection between said movable member and said pump operating mechanism to compress said spring, means to interrupt said connection when said spring has been compressed to a predetermined extent, a detent to hold said movable member against movement by said spring, and means controlled by said controlling device to actuate said detent and release said movable member.

9. In a liquid dispensing apparatus comprising a measuring receptacle, a pump to fill said receptacle, operating mechanism for said pump, and means to control the discharge of liquid from said receptacle, a register, a rack bar having geared connection with said register, a spring to actuate said rack bar, means actuated by said pump operating mechanism to move said rack bar in a direction to compress said spring, means to hold said rack bar against movement by said spring, and means controlled by said controlling means to release said rack bar for movement by said spring.

10. In a liquid dispensing apparatus comprising a measuring receptacle, a pump to fill said receptacle, operating mechanism for said pump, and means to control the discharge of liquid from said receptacle, a register, a rack bar, a spring to move said rack bar in one direction, a pinion meshing with said rack bar and having operative connection with said register, a second pinion meshing with said rack bar to move the same against the action of said spring, an operative connection between said second pinion and said pump operating mechanism, and means actuated by said controlling means to control the operation of said rack bar by said spring.

11. In a liquid dispensing apparatus comprising a measuring receptacle, a pump to fill said receptacle, operating mechanism for said pump, and means to control the discharge of liquid from said receptacle, a register, a rack bar, a spring to move said rack bar in one direction, a pinion meshing with said rack bar and having operative connection with said register, a second pinion meshing with said rack bar to move the same against the action of said spring, an operative connection between said second pinion and said pump operating mechanism, means to interrupt said connection when said rack bar has been moved to a predetermined position, and means connected with said controlling means to control the operation of said rack bar by said spring.

12. In a liquid dispensing apparatus comprising a measuring receptacle, a pump to fill said receptacle, operating mechanism for said pump, and means to control the discharge of liquid from said receptacle, a register, a rack bar, a spring to actuate said rack bar, a pinion meshing with said rack bar and having operative connection with said register, a second pinion meshing with said rack bar, a rotatable member rigidly connected with said second member, a pawl carried by said rotatable member, a ratchet wheel arranged to engage said pawl, means for operatively connecting said ratchet wheel with said pump operating mechanism, means to move said pawl out of engagement with said ratchet wheel when said rack bar has been moved to a predetermined position, and means connected with said controlling means to control the movement of said rack bar by said spring.

13. In a liquid dispensing apparatus comprising a measuring receptacle, a pump to fill said receptacle, operating mechanism for said pump, and means to control the discharge of liquid from said receptacle, a register, a rack bar, a spring to impart movement to said rack bar, a pinion meshing with said rack bar, means comprising a one-way clutch to connect said pinion with said register, a second pinion meshing with said rack bar to move the same against the action of said spring, a rotatable member rigidly connected with said second pinion, means comprising a one-way clutch to connect said second pinion with the operating mechanism for said pump, means to actute the last mentioned one-way clutch to disconnect said second pinion from said pump operating mechanism when said rack bar has been moved to a predetermined position, and means connected with said controlling means to control the movement of said rack bar by said spring.

14. In a liquid dispensing apparatus comprising a measuring receptacle, a pump to fill said receptacle, operating mechanism for said pump, and means to control the discharge of liquid from said receptacle, a register, a rack bar, a spring to impart movement to said rack bar, a pinion meshing with said rack bar, means comprising a one-way clutch to connect said pinion with said register, a second pinion meshing with said rack bar to move the same against the action of said spring, a rotatable member rigidly connected with said second pinion, means comprising a one-way clutch to connect said second pinion with the operating mechanisms for said pump, means to actuate the last mentioned one-way clutch to disconnect said second pinion from said pump operating mechanism when said rack bar has been moved to a predetermined position, means connected with said controlling means to control the movement of said rack bar by said spring, and means controlled by the movement of said rack bar by said spring to actuate said last mentioned one-way clutch to again connect said second pinion with said pump operating mechanism.

15. In a liquid dispensing apparatus comprising a measuring receptacle, a pump to fill said receptacle, operating mechanism for said pump, and means to control the discharge of liquid from said receptacle, a register, a rack bar, a spring to impart movement to said rack bar, a pinion meshing with said rack bar, means comprising a one-way clutch to connect said pinion with said register, a second pinion meshing with said rack bar, a rotatable member rigidly connected with said second pinion, a pawl carried by said rotatable member, a ratchet wheel arranged to engage said pawl and rotate said rotatable member and said second pinion in a direction to move the rack bar against the action of said spring, means for operatively connecting said ratchet wheel with said pump operating mechanism, means to move said pawl into an inoperative position when said rack bar has been moved to a predetermined position, a detent to hold said rack bar against movement by said spring, and means controlled by said controlling means to actuate said detent and release said rack bar.

16. In a liquid dispensing apparatus comprising a measuring receptacle, a pump to fill said receptacle, operating mechanism for said pump, and means to control the discharge of liquid from said receptacle, a register, a rack bar, a spring to impart movement to said rack bar, a pinion meshing with said rack bar, means comprising a one-way clutch to connect said pinion with said register, a second pinion meshing with said rack bar, a rotatable member rigidly connected with said second pinion, a pawl carried by said rotatable member, a ratchet wheel arranged to engage said pawl, and rotate said rotatable member and said second pinion in a direction to move the rack bar against the action of said spring, means for operatively connecting said ratchet wheel with said pump operating mechanism, means to move said pawl into an inoperative position when said rack bar has been moved to a predetermined position, a detent to hold said rack bar against movement by said spring, means controlled by said controlling means to actuate said detent and release said rack bar, means to hold said pawl in its inoperative position during the rotation of said second pinion by said rack bar, and means controlled by the movement of said rack bar by said spring to again move said pawl into operative engagement with said ratchet wheel.

17. In a liquid dispensing apparatus comprising a measuring device and means for controlling the same, a computing and registering device comprising a counter gear, a rotatable actuating device having a toothed segment, a second toothed segment arranged to be engaged by said actuator segment, a gear connected with said second toothed segment and with said counter gear, means controlled by said controlling means to impart a predetermined movement to said actuating device, and means to adjust said second toothed segment with relation to said actuator segment to cause said second toothed segment to be moved different distances by the predetermined movement of said actuator segment.

18. In a liquid dispensing apparatus comprising a measuring device and means for controlling the same, a computing and registering device comprising a plurality of counter gears, gears connected with said counter gears, toothed segments connected with the respective last mentioned gears, an actuator comprising a plurality of toothed segments arranged to successively engage the first mentioned toothed segments, and means controlled by said controlling means to impart a predetermined movement to said actuator.

19. In a liquid dispensing apparatus comprising a measuring device and means for controlling the same, a computing and registering device comprising a plurality of counter gears, gears connected with said counter gears, toothed segments connected with the respective gears and arranged normally in adjacent radial positions, an actuator having a plurality of toothed segments arranged in different radial positions and adapted to successively engage the respective first mentioned segments, and means controlled by said controlling device to impart a predetermined movement to said actuator.

20. In a liquid dispensing apparatus comprising a measuring device and means for controlling the same, a computing and registering device comprising a plurality of counter gears, gears connected with the counter gears, toothed segments connected with the respective gears and arranged normally in adjacent radial positions, an actuator having a plurality of toothed segments arranged in different radial positions and adapted to successively engage the respective first mentioned segments, means to adjust the first mentioned toothed segments with relation to the respective actuator segments, and means controlled by said controlling means to impart a predetermined movement to said actuator.

21. In a liquid dispensing apparatus comprising a measuring device and means for controlling the same, a computing and registering device comprising a counter wheel, a gear to actuate said counter wheel, a toothed segment connected with said gear, an actuator having a toothed segment to engage the first mentioned toothed segment and actuate said counter wheel, means controlled by said controlling means to impart a predetermined movement to said actuator segment, and means controlled by the movement of said actuator to return the first mentioned toothed segment to its initial position.

22. In a liquid dispensing apparatus comprising a measuring device and means for controlling the same, a computing and registering device comprising a counter wheel, a gear to actuate said counter wheel, a toothed segment connected with said gear, an actuator having a toothed segment to engage the first mentioned toothed segment and actuate said counter wheel, means controlled by said controlling means to impart a predetermined movement to said actuator segment, resetting segments connected respectively with the first mentioned segment and the actuator segment, and an intermediate gear interposed between the last mentioned segments.

23. In a liquid dispensing apparatus comprising a measuring device and means for controlling the same, a computing and registering device comprising counter wheels, gears connected with the respective counter wheels, toothed segments rigidly connected with the respective gears and arranged normally in adjacent radial positions, resetting segments rigidly secured to the respective toothed segments, actuator mechanism comprising toothed segments arranged in different radial positions and adapted to successively engage the first mentioned toothed segments, resetting segments connected with the respective actuator segments, intermediate gears to transmit movement from the last mentioned resetting segments to the first mentioned resetting segments, said last mentioned resetting segments being arranged to engage said intermediate gears after all of the actuator segments have functioned, and means controlled by said controlling means to impart a predetermined movement to said actuator mechanism.

24. In a liquid dispensing apparatus comprising a measuring device, and means for controlling the same, a computing and registering mechanism comprising counter gears, an actuating device for said counter gears having a series of toothed segments rigidly connected one to the other and arranged in different radial positions, other toothed segments arranged to be engaged successively by the actuator segments, gears rigidly secured to the respective toothed segments, intermediate gear units each comprising gears meshing respectively with one of the first mentioned gears, and one of said counter gears, a one-way clutch connecting said intermediate gears one with the other, means connected with said actuating mechanism to return said second toothed segments to their initial positions, and means controlled by said controlling means to impart a predetermined movement to said actuating mechanism.

25. In a liquid dispensing apparatus comprising a measuring device and means for controlling the same, a computing and registering device comprising a counter wheel, a gear connected with said counter wheel, a toothed segment rigidly connected with said gear, a resetting segment rigidly connected with but adjustable with relation to said toothed segment, an actuating device having an actuator segment to engage the first mentioned toothed segment, a resetting segment rigidly secured to said actuator segment, an intermediate gear to connect the last mentioned resetting segment with the first mentioned resetting segment after said actuator segment has functioned, and means controlled by said controlling means to impart a predetermined movement to said actuating device.

26. In a liquid dispensing apparatus comprising a measuring device and means for controlling the same, a computing and registering device comprising a counter wheel, a gear connected with said counter wheel, a toothed segment rigidly connected with said gear, a resetting segment rotatable about the axis of said toothed segment, telescoping shafts rigidly connected respectively with said toothed segment and said resetting segment, adjusting devices secured to the respective shafts, means for securing said adjusting devices in adjusted positions with relation one to the other, an actuating device comprising a toothed segment to engage and operate the first mentioned toothed segment, and a resetting segment rigidly secured to said actuator segment, an intermediate gear to connect the last mentioned resetting segment to the first mentioned resetting segment, said last mentioned resetting segment being arranged to engage said intermediate gear after the actuator segment has functioned, and means controlled by said controlling means to impart a predetermined movement to said actuating device.

27. In a liquid dispensing apparatus comprising a measuring device and means for controlling the same, a computing and registering device comprising counter gears, an actuating shaft, means controlled by said controlling means for imparting one complete rotation to said actuating shaft on the discharge of each measured quantity of liquid from said apparatus, a plurality of actuating segments rigidly secured to said actuating shaft and arranged in different radial positions, a resetting segment rigidly secured to each said actuator segments, a second shaft arranged parallel with said actuating shaft, a plurality of pairs of telescoping sleeves mounted on said second shaft for rotation with relation one to the other, a toothed segment rigidly connected with one sleeve of each pair of sleeves, a resetting segment secured to the other sleeve of each pair of sleeves, means connected with the outer ends of the sleeves of each pair of sleeves to adjust the same with relation one to the other and to rigidly secure the same in their adjusted positions, intermediate gears to connect the resetting segments on the actuating shaft with the respective last mentioned resetting segments, gears rigidly secured to the last mentioned toothed segments, and means comprising an overrunning clutch for connecting the last mentioned gears with the respective counter gears.

28. In a liquid dispensing apparatus comprising a measuring device and means for controlling the same, a computing and registering mechanism comprising a total counter gear, an actuating device having a plurality of toothed segments arranged in different radial positions, means controlled by said controlling means for imparting predetermined movement to said actuating device, other toothed segments arranged to be successively engaged and actuated by the actuator segments, gears connected with the last mentioned toothed segments, means for connecting the last mentioned gears with said total counter gear, and means controlled by said actuating device to restore said second toothed segments to their initial positions without displacing any of said counter gears.

29. In a dispensing apparatus comprising a measuring device and means for controlling the same, a computing and registering device comprising a counter wheel to register fractions of units, a second counter wheel to register units and a third counter wheel to register tens of units, means controlled by said controlling means to separately actuate said counter wheels, and means actuated upon the first operation of said fraction counter wheel to add a full unit to said units counter wheel, and means actuated upon the tenth operation of said units counter wheel to add ten units to said tens counter wheel.

30. In a dispensing apparatus comprising a measuring device and means for controlling the same, a computing and registering device comprising a counter wheel to register fractions of a unit and a second counter wheel to register units, means controlled by said controlling means to separately actuate said counter wheels, and means actuated upon an operation of said fraction counter wheel prior to the tenth operation thereof to add a full unit to said units counter wheel.

31. In a dispensing apparatus comprising a measuring device and means for controlling the same, a computing and registering device comprising a counter wheel to register fractions of units, a second counter wheel to register units and a third counter wheel to register tens of units, means controlled by said controlling means to separately actuate said counter wheels, and means connected with said fraction counter wheel to actuate said units counter wheel upon an operation of said fraction counter wheel prior to the tenth operation thereof, and means actuated upon the tenth operation of said units counter wheel to actuate said tens counter wheel.

32. In liquid dispensing apparatus, the combination of measuring means adapted to be operatively associated with liquid supply means whereby liquid dispensed may be measured, a register operatively associated with said measuring means, means other than said measuring means for driving said register, and control means operatively associated with said measuring means for controlling the driving of said register by said driving means and being connected with or disconnected from said driving means in accordance with the operation of said measuring means.

33. In liquid dispensing apparatus, the combination of measuring means adapted to be operatively associated with liquid supply means whereby liquid dispensed may be measured, a register operatively associated with said measuring means, means other than said measuring means for driving said register, and control means operatively associated with said driving means for controlling the driving of said register by said driving means and being connected with or disconnected from said driving means in accordance with the operation of said measuring means.

34. In liquid dispensing apparatus, the combination of measuring means adapted to be operatively associated with liquid supply means whereby liquid dispensed may be measured, a register operatively associated with said measuring means, means other than said measuring means for driving said register, and control means operatively associated with said measuring means and said driving means for controlling the driving of said register by said driving means and being connected with or disconnected from said driving means in accordance with the operation of said measuring means.

35. In liquid dispensing apparatus, the combination of measuring means for measuring liquid, a cost register operatively associated with said measuring means, means other than said measuring means for actuating said cost register, means associated with said measuring means for controlling the actuation of said cost register, and means for variably effecting the operation of the register for each unit measured by the measuring means.

36. In liquid dispensing apparatus, the combination of measuring means for measuring the liquid dispensed, registering mechanism for registering the amount of liquid dispensed and the cost of said liquid, means synchronized with said measuring means for causing operation of said registering mechanism in accordance with the measuring of liquid by said measuring means, and variating means interposed between the second named means and the cost registering portion of said registering mechanism for varying the setting at which said cost registering portion will compute, said variating means including members operative for only a predetermined movement thereof in accordance with their setting.

37. In liquid dispensing apparatus, the combination of measuring means for measuring the liquid dispensed, registering mechanism for registering the amount of liquid dispensed and the cost of said liquid, means synchronized with said measuring means for causing operation of said registering mechanism in accordance with the measuring of liquid by said measuring means, and distance variating means interposed between the second named means and the cost registering portion of said registering mechanism for varying the setting at which said cost registering portion will compute.

38. In registering mechanism, the combination of cost registering means and amount registering means, operating means therefor, and variating means interposed between said operating means and said cost registering means for varying the setting at which said cost registering means will compute, said variating means including members operative for only a predetermined movement thereof in accordance with their setting.

39. In registering mechanism, the combination of cost registering means and amount registering means, operating means therefor, and distance variating means interposed between said operating means and said cost registering means for varying the setting at which said cost registering means will compute.

40. In liquid dispensing apparatus, the combination of measuring means for measuring the liquid dispensed, registering mechanism for registering the amount of liquid dispensed and the cost of said liquid, and variating means operatively associated with the cost registering portion of said registering mechanism for varying the setting at which said cost registering portion will compute, said variating means including members operative for only a predetermined movement thereof in accordance with their setting.

41. In liquid dispensing apparatus, the combination of measuring means for measuring the liquid dispensed, registering mechanism for registering the amount of liquid dispensed and the cost of said liquid, and distance variating means operatively associated with the cost registering portion of said registering mechanism for varying the setting at which said cost registering portion will compute, said variating means including members operative for only a predetermined movement thereof in accordance with their setting.

42. In liquid dispensing apparatus, the combination of measuring means, a pump adapted to be associated with said measuring means and liquid supply means whereby liquid dispensed may be measured, a register operatively associated with said measuring means, driving means for said pump, second driving means controlled by said first driving means and other than said measuring means for driving said register, and control means operatively associated with said measuring means for controlling the driving of said register.

43. In liquid dispensing apparatus, the combination of measuring means, a pump adapted to be associated with said measuring means and liquid supply means whereby liquid dispensed may be measured, a register operatively associated with said measuring means, driving means for said pump, second driving means controlled by said first driving means and other than said measuring means for driving said register, and control means operatively associated with said driving means for controlling the driving of said register.

44. In liquid dispensing apparatus, the combination of measuring means, a pump adapted to be associated with said measuring means and liquid supply means whereby liquid dispensed may be measured, a register operatively associated with said measuring means, driving means for said pump, second driving means controlled by said first driving means and other than said measuring means for driving said register, and control means operatively associated with said measuring means and said driving means for controlling the driving of said register.

WILLIAM M. CARROLL.